US012578959B1

(12) United States Patent     (10) Patent No.:   US 12,578,959 B1

Vadrevu et al.     (45) Date of Patent:    Mar. 17, 2026

(54) AUTOMATED SOFTWARE DEPLOYMENT AND MANAGEMENT

(71) Applicant: Fannie Mae, Washington, DC (US)

(72) Inventors: Srinivasa Rao Vadrevu, Fort Worth, TX (US); Sailaja Malladi, Herndon, VA (US)

(73) Assignee: Fannie Mae, Washington, DC (US)

( * ) Notice: Subject to any disclaimer, the term of this patent is extended or adjusted under 35 U.S.C. 154(b) by 204 days.

(21) Appl. No.: 18/416,078

(22) Filed: Jan. 18, 2024

(51) Int. Cl.
   *G06F 9/44*       (2018.01)
   *G06F 8/658*     (2018.01)
   *G06F 8/71*       (2018.01)

(52) U.S. Cl.
   CPC ................ *G06F 8/658* (2018.02); *G06F 8/71* (2013.01)

(58) Field of Classification Search
   CPC ...................................................... G06F 8/658
   USPC .......................................................... 717/168
   See application file for complete search history.

(56) References Cited

U.S. PATENT DOCUMENTS

| | | | | |
|---|---|---|---|---|
| 8,479,008 | B2 * | 7/2013 | Lin ....................... | H04L 63/123 |
| | | | | 713/178 |
| 11,314,610 | B2 * | 4/2022 | Gudka ................ | G06F 11/0772 |
| 11,429,384 | B1 * | 8/2022 | Navert ...................... | G06F 8/60 |
| 2014/0258984 | A1 * | 9/2014 | Kramer ..................... | G06F 8/71 |
| | | | | 717/121 |
| 2022/0413954 | A1 * | 12/2022 | Kuris .................. | G06F 21/6209 |
| 2025/0190196 | A1 * | 6/2025 | Butscher ............. | G06F 11/3698 |

* cited by examiner

*Primary Examiner* — Evral E Bodden
(74) *Attorney, Agent, or Firm* — Michael Best & Friedrich LLP

(57) ABSTRACT

A system includes a software release validation platform and a software release deployment platform. The software release validation platform is configured to generate a release container, generate an issue and automatically associate the issue with the release container, and transmit a command signal to the software release deployment platform. The software release validation platform is configured to, in response to receiving the command signal, access the software release validation platform and process a status of the issue. The software release validation platform is configured to, in response to the status of the issue being a completed status, retrieve source code from a source code repository platform, compile the source code, deploy the source code to a production platform, and determine an effective lead time metric based on metadata about the source code in the source code repository and metadata about the source code in the release container.

14 Claims, 34 Drawing Sheets

700

Software Validation Application

Metrics Dashboard

| Project | Agile Program Increment | Agile Release | Waterfall Release | Total |
|---|---|---|---|---|
| Project Name | 705 | 4326 | 275 | 5306 |
| Total Unique Issues: | 705 | 4326 | 275 | 5306 |

1902

Software Validation Application

Create 2644

Register Release Container

| | | | |
|---|---|---|---|
| Release Name: | Field 2604 | Description: | Field 2606 |
| Deployment Start Date: | Field 2608 | Deployment End Date: | Field 2610 |
| Primary Asset: | Field 2612 | Routine Release: | Field 2614 |
| Secondary Assets: | Field 2616 | Epic Keys: | Field 2618 |
| Primary Asset Name: | Field 2620 | Primary Program: | Field 2622 |
| Delivery Container: | Field 2624 | Primary Assignment Group: | Field 2626 |
| Primary Template Name: | Field 2628 | Blue/Green Deployment: | Field 2630 |
| Long Window Business Justification: | Field 2632 | Release Type: | Field 2634 |
| Business Justification Comments: | Field 2636 | Requested For: | Field 2638 |
| Build ID/Version: | Field 2640 | Primary Release Approver: | Field 2642 |

Source Code Repository Application

| Author: | Commit: | Message: | Commit Date: | Issue Name: |
|---------|---------|----------|--------------|-------------|
| Author Name | Commit Name 3002 | Message | Commit Date | Field 3020 |
| Author Name | Commit Name 3004 | Message | Commit Date | Field 3022 |
| Author Name | Commit Name 3006 | Message | Commit Date | Field 3024 |
| Author Name | Commit Name 3008 | Message | Commit Date | Field 3026 |
| Author Name | Commit Name 3010 | Message | Commit Date | Field 3028 |
| Author Name | Commit Name 3012 | Message | Commit Date | Field 3030 |
| Author Name | Commit Name 3014 | Message | Commit Date | Field 3032 |
| Author Name | Commit Name 3016 | Message | Commit Date | Field 3034 |
| Author Name | Commit Name 3018 | Message | Commit Date | Field 3036 |

*FIG. 30*

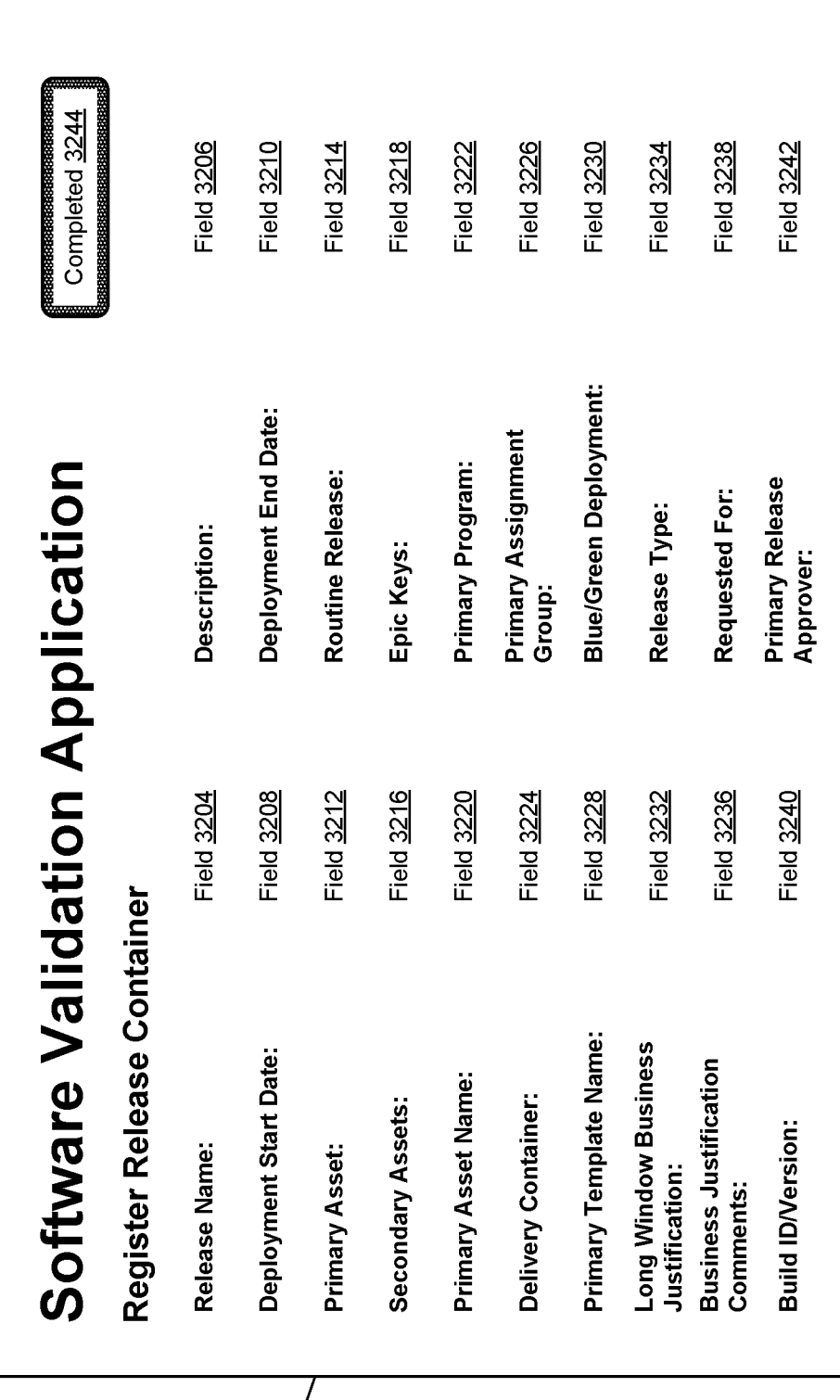

Software Validation Application

Register Release Container

Completed 3244

| | | | |
|---|---|---|---|
| Release Name: | Field 3204 | Description: | Field 3206 |
| Deployment Start Date: | Field 3208 | Deployment End Date: | Field 3210 |
| Primary Asset: | Field 3212 | Routine Release: | Field 3214 |
| Secondary Assets: | Field 3216 | Epic Keys: | Field 3218 |
| Primary Asset Name: | Field 3220 | Primary Program: | Field 3222 |
| Delivery Container: | Field 3224 | Primary Assignment Group: | Field 3226 |
| Primary Template Name: | Field 3228 | Blue/Green Deployment: | Field 3230 |
| Long Window Business Justification: | Field 3232 | Release Type: | Field 3234 |
| Business Justification Comments: | Field 3236 | Requested For: | Field 3238 |
| Build ID/Version: | Field 3240 | Primary Release Approver: | Field 3242 |

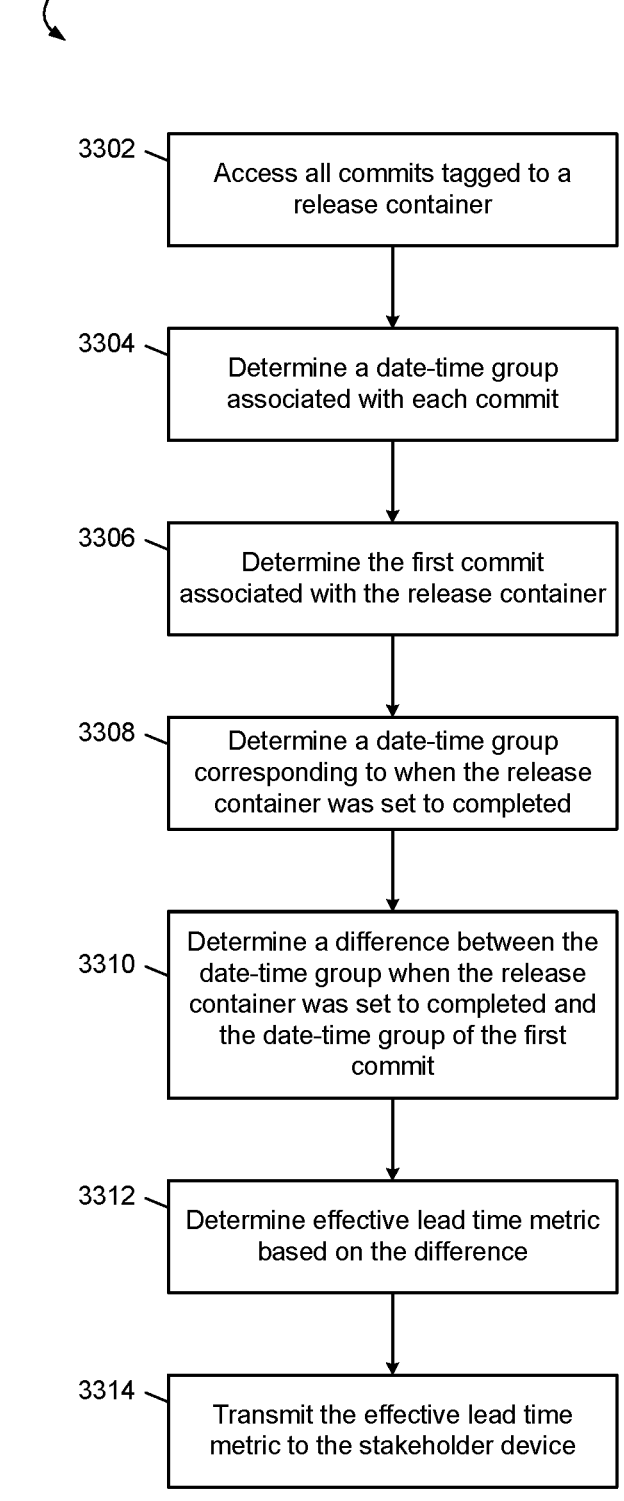

3302 — Access all commits tagged to a release container

3304 — Determine a date-time group associated with each commit

3306 — Determine the first commit associated with the release container

3308 — Determine a date-time group corresponding to when the release container was set to completed 3310 — Determine a difference between the date-time group when the release container was set to completed and the date-time group of the first commit 3312 — Determine effective lead time metric based on the difference 3314 — Transmit the effective lead time metric to the stakeholder device

*FIG. 33*

Effective Lead Time Metric Report

| Release Name: | Est. Start Date: | Est. End Date: | Effective Lead Time: |
|---|---|---|---|
| Release Name Field 3404 | Start Date Field 3418 | End Date Field 3434 | Lead Time Field 3448 |
| Release Name Field 3406 | Start Date Field 3420 | End Date Field 3436 | Lead Time Field 3450 |
| Release Name Field 3408 | Start Date Field 3424 | End Date Field 3438 | Lead Time Field 3452 |
| Release Name Field 3410 | Start Date Field 3426 | End Date Field 3440 | Lead Time Field 3454 |
| Release Name Field 3412 | Start Date Field 3428 | End Date Field 3442 | Lead Time Field 3456 |
| Release Name Field 3414 | Start Date Field 3430 | End Date Field 3444 | Lead Time Field 3458 |
| Release Name Field 3416 | Start Date Field 3432 | End Date Field 3446 | Lead Time Field 3460 |

AUTOMATED SOFTWARE DEPLOYMENT AND MANAGEMENT

FIELD

The present disclosure relates to inter-process communication and software development systems and, more particularly, to data processing systems for automated software development, installation, and management.

SUMMARY

Governance controls are mechanisms and control measures implemented during software development to ensure deployed software meets quality and/or security standards (and, in some implementations, legal and/or regulatory requirements). For example, governance controls can include quality assurance controls and security controls. Quality assurance controls can include, for example, unit testing, integration testing, static code testing, regression testing, and/or load testing. Unit testing may include the testing of individual software components to ensure that they work as expected. Integration testing may include the testing of interactions between different software components to identify and/or address issues related to the interactions between the integrated components. Integration testing may ensure that the combined components of an application function together as expected. Static code testing may include testing source code before the software component or application is compiled and executed. Static code testing may identify errors, potential bugs, security vulnerabilities, and/or areas of non-compliance with coding standards.

Regression testing may test newly developed or updated code, components, and/or applications to ensure that they do not adversely impact existing features of other pre-existing components and/or applications. Regression testing may catch bugs introduced into previously functioning features as a result of the updated code, components, and/or applications. Load testing may apply simulated real-world user loads to software components and/or applications to gauge how the components and/or applications (and/or computing systems implementing the components and/or applications) perform. Load testing may identify performance bottlenecks and ensure that the components, applications, and/or computing systems can handle anticipated user traffic without degraded performance or crashes. In additional to the previously described governance controls, other governance controls can create audit trails by documenting changes, approvals, and/or deployments. Such governance controls may be important for traceability, accountability, and/or forensic analysis (for example, performed in response to a security incident). Thus, the effective implementation of governance controls facilitates better change management, ensuring that software releases are deployed in a controlled manner, with minimal disruption to users.

Effectively implementing and tracking software governance controls across complex software deployments presents a variety of technical challenges. For example, modern software deployments often involve complex architectures that include multiple software components and/or applications deployed across multiple computing platforms and/or systems. Each component and/or application may have multiple dependencies (e.g., they may depend on another and/or another may depend on them). Furthermore, modern software development may follow agile methodologies and continuous integration/continuous deployment (CI/CD)

practices, which may lead to frequent changes and updates. Ensuring governance controls are implemented, kept up-to-date, and account for dependencies across a complex software deployment thus presents significant technical challenges.

Systems, apparatuses, methods, and techniques described in this specification provide technical solutions to these problems and more by automatically generating governance controls for new software releases and automatically ensures that the governance controls are fully implemented before the software releases are deployed to the production environment.

The complexity of modern software releases creates significant technical challenges to ensuring that only complete and stable code is compiled and deployed. For example, during development, modern software releases often have multiple components distributed across multiple repositories. These components may also have complex dependencies and interactions. In modern continuous integration/continuous development (CI/CD) software development processes, software releases are deployed frequently, sometimes multiple times a day. Thus, the complexity and pace of modern software releases presents significant technical challenges to ensuring that the multitude of software components are tracked to the correct software release and that each of the components of a software release are completed before the software release is deployed. Ensuring that the software components for a software release are completed.

Certifying the completion of each component before the software release is deployed helps maintain software quality and integrity as well as stability and reliability of the production platform that the software release is deployed to. Completing and certifying each component before deployment helps catch bugs before they make it into the production environment, where they can be much more difficult to address. Furthermore, completing and certifying each component before deployment ensures that each component works correctly with others and that the entire software release performs as expected, which reduces downtime and ensures predictable performance for the production environment.

Systems, apparatuses, methods, and techniques described in this specification provide technical solutions to these problems by automatically ensuring that each of the components of a software release are certified as completed before the software releases are deployed to the production environment.

A system includes a software release validation platform including a first electronic processor and a software release deployment platform including a second electronic processor. The first electronic processor is configured to receive a first input at a first input field of a graphical user interface, generate a release container associated with the first input, receive a second input at a second input field of the graphical user interface, generate an issue and automatically associate the issue with the release container based on the second input, receive a third input at a third input field of the graphical user interface, and transmit a command signal in response to receiving the third input. The second electronic processor is configured to receive the command signal, access the software release validation platform and process a status of the issue in response to receiving the command signal, and, in response to the status of the issue being a completed status: retrieve source code from a source code repository platform, compile the source code, deploy the compiled source code to a production platform, and determine an effective lead time metric based on metadata about the source code in the source code repository and metadata about the source code in the release container.

In other features, the first input includes an identifier of a software release. In other features, the second input includes the identifier of the software release. In other features, the source code is tagged with the identifier of the software release. In other features, the source code repository platform includes a plurality of commits tagged to the issue. Each commit includes source code. In other features, the retrieved source code is associated with a commit tagged to the issue. In other features, the first electronic processor is configured to access the plurality of commits tagged to the issue, determine a first commit of the plurality of commits tagged to the issue, and determine a first date-time group associated with the first commit.

In other features, the first electronic processor is configured to determine a second date-time group corresponding to a time the first electronic processor received the third input. In other features, the first electronic processor is configured determine the effective lead time metric based on a difference between the first date-time group and the second date-time group. In other features, the first electronic processor is configured to generate a message containing the effective lead time metric and transmit the message to a stakeholder device.

A method includes receiving, with a software release validation platform, a first input at a first input field of a graphical user interface, generating, with the software release validation platform, a release container associated with the first input, receiving, with the software release validation platform, a second input at a second input field of the graphical user interface, generating, with the software release validation platform, an issue and automatically associating the issue with the release container based on the second input, receiving, with the software release validation platform, a third input field at a third input field of the graphical user interface, transmitting, with the software release validation platform, a command signal in response to receiving the third input, receiving, with a software release deployment platform, the command signal, and accessing, with the software release deployment platform, the software release validation platform and processing a status of the issue in response to receiving the command signal. The method includes, in response to the status of the issue being a completed status: retrieving, with the software release deployment platform, source code from a source code repository platform, compiling, with the software release deployment platform, the source code, deploying, with the software release deployment platform, the source code to a production platform, and determining an effective lead time metric based on metadata about the source code in the source code repository and metadata about the source code in the release container.

In other features, the first input includes an identifier of a software release. In other features, the second input includes the identifier of the software release. In other features, the source code is tagged with the identifier of the software release. In other features, the source code repository platform includes a plurality of commits tagged to the issue. Each commit includes source code. In other features, the retrieved source code is associated with a commit tagged to the issue. In other features, the method includes accessing, with the software release validation platform, the plurality of commits tagged to the issue, determining, with the software release validation platform, a first commit of the plurality of commits tagged to the issue, and determining, with the software release validation platform, a first date-time group associated with the first commit.

In other features, the method includes determining, with the software release validation platform, a second date-time group corresponding to a time the software release validation platform received the third input. In other features, the method includes determining, with the software release validation platform, the effective lead time metric based on a difference between the first date-time group and the second date-time group. In other features, the method includes generating, with the software release validation platform, a message containing the effective lead time metric and transmitting, with the software release validation platform, the message to a stakeholder device.

Other examples, embodiments, features, and aspects will become apparent by consideration of the detailed description and accompanying drawings.

BRIEF DESCRIPTION OF THE DRAWINGS

FIGS. 26-29, 31, and 32 are diagrams illustrating examples of a graphical user interface generated by a software release validation platform for a release container.

FIG. 30 is a diagram illustrating an example graphical user interface generated by a source code repository platform.

FIG. 33 is a flowchart illustrating an example process for automatically generating metrics related to the software development process of FIGS. 24 and 25.

FIG. 34 is an example illustrating a graphical user interface displaying an example message generated by a software validation platform containing the effective lead time metric.

In the drawings, reference numbers may be reused to identify similar and/or identical elements.

DETAILED DESCRIPTION

Figure 1:
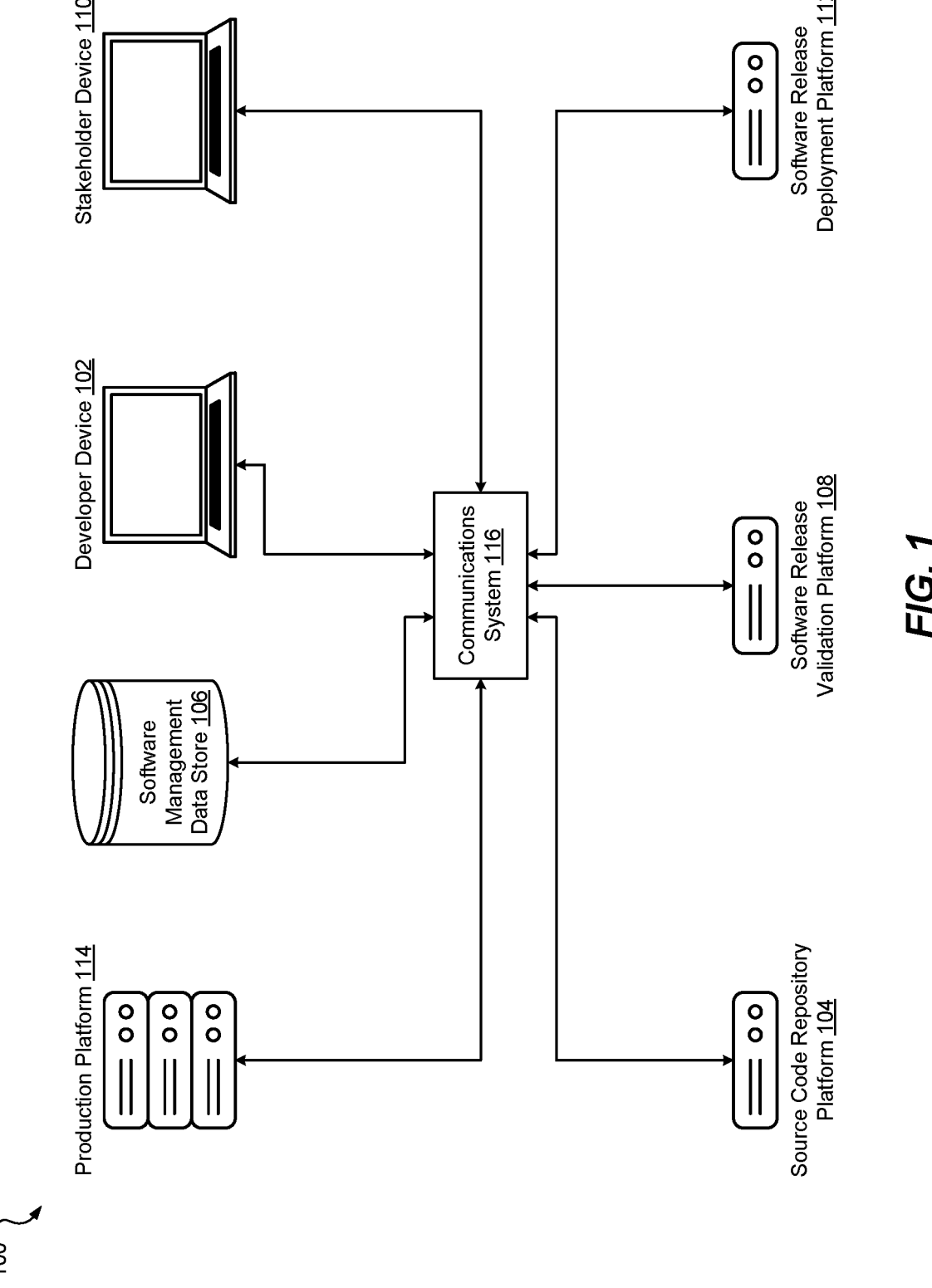
FIG. 1 is a block diagram illustrating an example computing system for developing, deploying, and executing software releases.

FIG. 1 is a block diagram illustrating an example computing system 100 for developing, deploying, and executing software releases. As shown in FIG. 1, some examples of the system 100 include a developer device 102, a source code repository platform 104, a software management data store 106, a software release validation platform 108, a stakeholder device 110, a software release deployment platform 112, a production platform 114, and/or a communications system 116. Although only a single developer device 102, source code repository platform 104, software management data store 106, software release validation platform 108, stakeholder device 110, software release deployment platform 112, production platform 114, and communications system 116 are shown in the example of FIG. 1, in various implementations, the system 100 may include one or more of each device, platform, database, and/or system. In some examples, the developer device 102, source code repository platform 104, software management data store 106, software release validation platform 108, stakeholder device 110, software release deployment platform 112, and/or production platform 114 may communicate with one another via the communications system 116.

In various implementations, the developer device 102 may include any device on which source code for a software release can be developed. For example, the developer device 102 may include a personal computer (e.g., a desktop computer and/or a laptop computer), a server (e.g., a dedicated server and/or a virtual, cloud-based server), a mobile device (e.g., a smartphone and/or tablet), a workstation, a single-board computer (e.g., an Arduino and/or Raspberry Pi computer), a virtual reality headset, and/or an augmented reality device. In some examples, the source code repository platform 104 may be a platform where source code for software releases is stored, managed, and tracked. In various implementations, the software management data store 106 may include a data store (e.g., a database) including metadata about a software release.

In some examples, the software release validation platform 108 may be a platform that automatically generates governance controls for software releases and ensures that the governance controls are fully satisfied before allowing the software release to be deployed. In various implementations, the stakeholder device 110 may include a personal computer (e.g., a desktop computer and/or a laptop computer), a server (e.g., a dedicated server and/or a virtual, cloud-based server), a mobile device (e.g., a smartphone and/or tablet), a workstation, a single-board computer (e.g., an Arduino and/or Raspberry Pi computer), a virtual reality headset, and/or an augmented reality device. In some examples, the software release deployment platform 112 may be a platform that delivers and manages the deployment of software releases to the production platform 114.

In various implementations, the production platform 114 may include an environment where the software release is deployed and made available for end users. For example, the production platform 114 may include a cloud computing platform, a platform as a service (PaaS) platform, a container orchestration system, a web hosting service, a managed hosting service, a bare metal (or dedicated) server, a content delivery network, and/or a serverless computing platform. In various implementations, the production platform 114 may include a personal computer (e.g., a desktop computer and/or a laptop computer), a server (e.g., a dedicated server and/or a virtual, cloud-based server), a mobile device (e.g., a smartphone and/or tablet), a workstation, a single-board computer (e.g., an Arduino and/or Raspberry Pi computer), a virtual reality headset, and/or an augmented reality device.

In some examples, the communications system 116 includes one or more networks, such as a General Packet Radio Service (GPRS) network, a Time-Division Multiple Access (TDMA) network, a Code-Division Multiple Access (CDMA) network, a Global System of Mobile Communications (GSM) network, an Enhanced Data Rates for GSM Evolution (EDGE) network, a High-Speed Packet Access (HSPA) network, an Evolved High-Speed Packet Access (HSPA+) network, a Long Term Evolution (LTE) network, a Worldwide Interoperability for Microwave Access (WiMAX) network, a 5th-generation mobile network (5G), an Internet Protocol (IP) network, a Wireless Application Protocol (WAP) network, or an IEEE 802.11 standards network, as well as any suitable combination of the above networks. In various implementations, the communications system 116 includes an optical network, a local area network, and/or a global communication network, such as the Internet.

Figure 2:
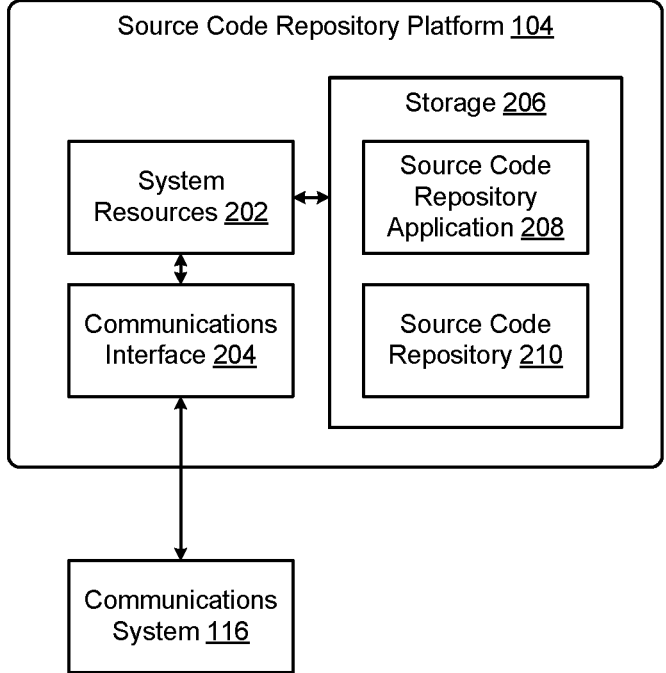
FIG. 2 is a block diagram illustrating an example source code repository platform.

FIG. 2 is a block diagram illustrating an example source code repository platform 104. In various implementations, the source code repository platform 104 includes system resources 202, a communications interface 204, and non-transitory computer-readable storage media, such as, for example, storage 206. The non-transitory computer-readable storage media may contain instructions that, when executed, cause an electronic processor to perform various functions described herein. In some examples, the system resources 202 include one or more electronic processors, one or more graphics processing units, volatile computer memory, non-volatile computer memory, and/or one or more system buses interconnecting the components of the source code repository platform 104. In various implementations, the communications interface 204 includes hardware and software components that communicate with other devices, platforms, and/or systems over the communications system 116. For example, the communications interface 204 may include one or more transceivers for sending and/or receiving data over the communications system 116.

In various implementations, storage 206 includes a source code repository application 208 and/or a source code repository 210. The source code repository application 208 may be a software tool that allows developers to manage and store source code. In various implementations, the source code repository application 208 may receive source code (for example, from other devices, platforms, and/or systems via the communications system 116) and store the source code in the source code repository 210. In various implementations, the source code repository application 208 may allow for version control by maintaining different versions of source code files (for example, allowing developers to track changes, revert to previous versions, etc.), facilitate collaboration (for example, allowing multiple developers on multiple developer devices to work on source code for the same project simultaneously), allow for the creation and merging of branches (for example, by creating and/or merging divergent copies of source code for developing new features or bugs), facilitate change review and approval of source code, generate history and audit trails (for example, by maintaining a detailed history of all changes to source code), and provide access control and security (for example, by allowing only authorized developers to access and/or make changes to source code). Additional functionality of the source code repository application 208 and the source code repository 210 will be described with reference to FIGS. 5-33.

Figure 3:
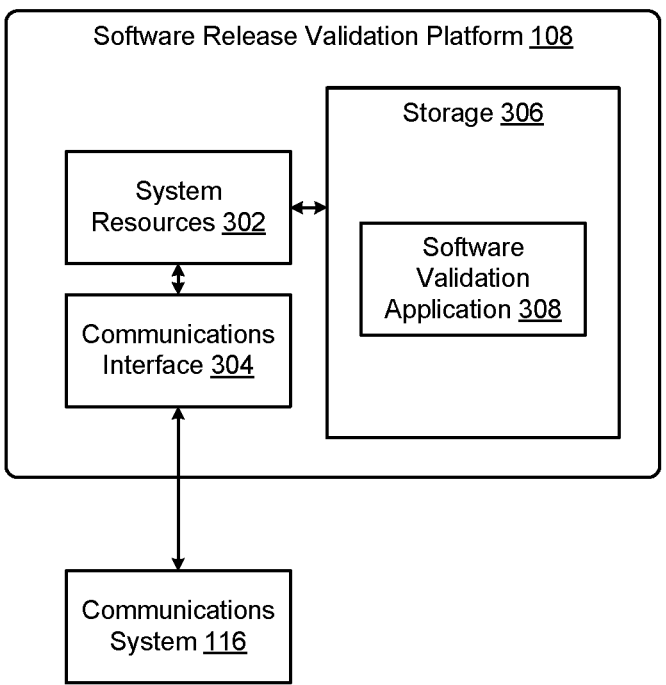
FIG. 3 is a block diagram illustrating an example software release validation platform.

FIG. 3 is a block diagram illustrating an example software release validation platform 108. In various implementations, the software release validation platform 108 includes system resources 302, a communications interface 304, and non-transitory computer-readable storage media, such as, for example, storage 306. The non-transitory computer-readable storage media may contain instructions that, when executed, cause an electronic processor to perform various functions described herein. In some examples, the system resources 302 include one or more electronic processors, one or more graphics processing units, volatile computer memory, non-volatile computer memory, and/or one or more system buses interconnecting the components of the software release validation platform 108. In various implementations, the communications interface 304 includes hardware and software components that communicate with other devices, platforms, and/or systems over the communications system 116. For example, the communications interface 304 may include one or more transceivers for sending and/or receiving data over the communications system 116.

In various implementations, storage 306 includes a software validation application 308. The software validation application 308 may automatically generate a software release governance management package for a software release and a graphical user interface for users (e.g., developers and stakeholders) to access the software release governance management package. The software validation application 308 may automatically generate governance controls for the software release and populate the software release governance management package with the governance controls. Users may access the governance controls via the graphical user interface and certify that the software release is compliant with each governance control. The software validation application 308 may control deployment of the software release by preventing other platforms (e.g., the software release deployment platform 112) from deploying the software release (for example, to the production platform 114) until all of the governance controls are certified. Additional functionality of the software validation application 308 will be described with reference to FIGS. 5-33.

Figure 4:
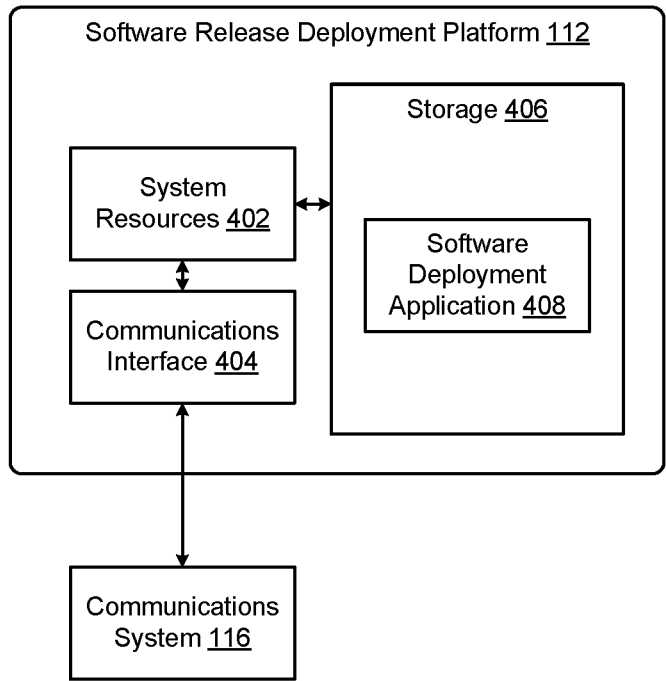
FIG. 4 is a block diagram illustrating an example software release deployment platform.

FIG. 4 is a block diagram illustrating an example software release deployment platform 112. In various implementations, the software release deployment platform 112 includes system resources 402, a communications interface 404, and non-transitory computer-readable storage media, such as, for example, storage 406. The non-transitory computer-readable storage media may contain instructions that, when executed, cause an electronic processor to perform various functions described herein. In some examples, the system resources 402 include one or more electronic processors, one or more graphics processing units, volatile computer memory, non-volatile computer memory, and/or one or more system buses interconnecting the components of the software release deployment platform 112. In various implementations, the communications interface 404 includes hardware and software components that communicate with other devices, platforms, and/or systems over the communications system 116. For example, the communications interface 404 may include one or more transceivers for sending and/or receiving data over the communications system 116.

In various implementations, storage 406 includes a software deployment application 408. The software deployment application 408 can automatically compile a software release (for example, by retrieving source code from the source code repository 210 and compiling the retrieved source code into assembly language code, executable binary instructions, executable programs, etc.) and deploying the software release (for example, by pushing the compiled source code to the production platform 114). Additional functionality of the software deployment application 408 will be described with reference to FIGS. 5-33.

Figure 5:
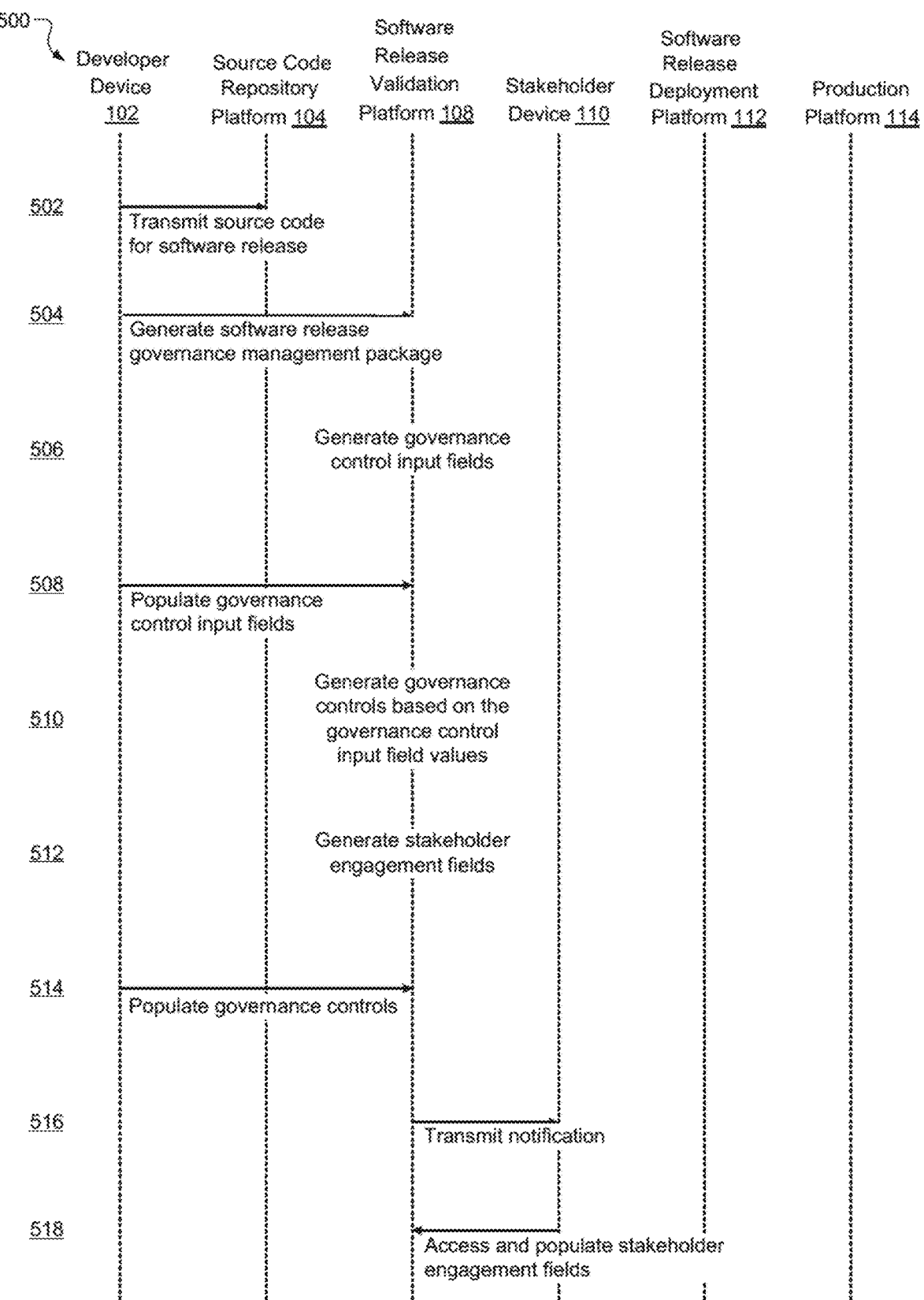
FIGS. 5 and 6 are a message sequence chart illustrating example interactions between components of the computing system of FIG. 1.
Figure 6:
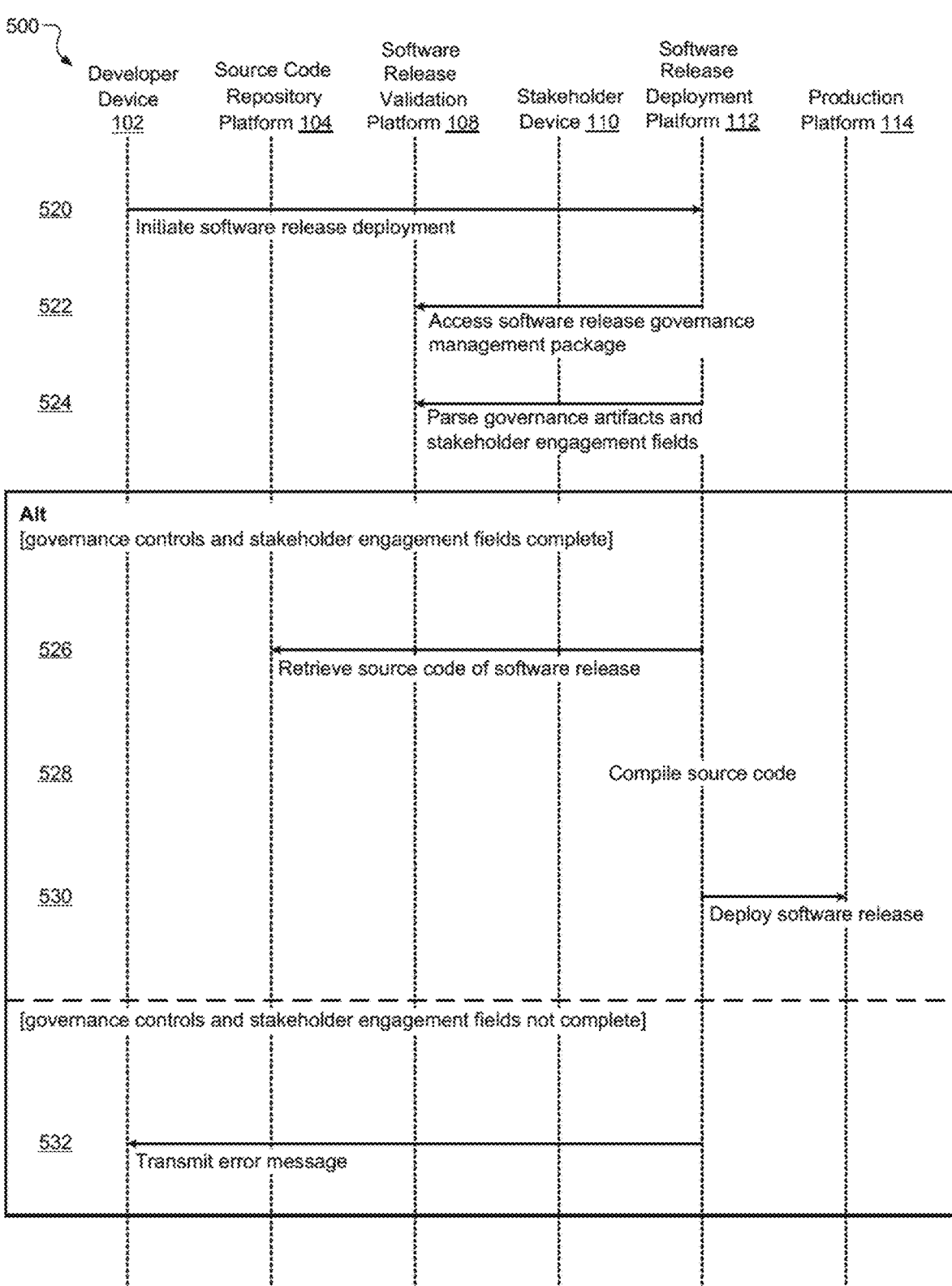

FIGS. 5 and 6 are a message sequence chart 500 illustrating example interactions between components of the computing system 100 as the computing system 100 automatically generates governance controls for a software release, checks the software release for compliance against the governance controls, and deploys the compliant software release to a production environment. In the message sequence chart 500, a user (e.g., a software developer) transmits source code for a software release from a developer device 102 to a source code repository platform 104 (at operation 502). For example, the user accesses the source code repository application 208 from the developer device 102 via the communications system 116 and uploads the source code to the source code repository application 208. The source code repository application 208 receives the source code and deposits the source code in the source code repository 210. In various implementations, the source code repository application 208 generates metadata about the source code and transmits the metadata (via the communications system 116) to the software management data store 106.

In some examples, the metadata includes a unique asset identifier (e.g., an alphanumeric string) for each software release and additional metadata about the software release associated with the unique asset identifier. In various implementations, the additional metadata includes a program increment identifier, an asset name, an asset criticality identifier, an asset business owner identifier, an asset technology owner identifier, a system integrator (SI) identifier, a program name identifier, and/or an agile practice identifier. The program increment name identifier may identify a timeboxed planning interval during which the software release is developed and/or deployed (or planned to be developed and/or deployed). The asset name may be a common name or title given to the software release. The asset criticality identifier may categorize an importance of the software release (for example, high, medium, or low). The asset business owner identifier may identify the user responsible for the strategic management and/or oversight of the software release. The asset technology owner identifier may identify the user responsible for technical aspects of the software release (such maintenance, upgrades, security updates, etc.).

The SI identifier may identify the user responsible for integrating the software release into other software systems and ensuring that the software release and other software systems function together. The program name identifier may identify a larger set of software or a software system that the software release is a part of. The agile practice identifier may identify the specific agile practice methodology or framework that the software release is developed under (for example, Scrum, Kanban, Lean, SAFe, etc.). In various implementations, the additional metadata includes information about upstream and/or downstream dependencies of the software release. Upstream dependencies are other software modules, applications, and/or packages whose outputs the software release relies upon. Downstream dependencies are other software modules, applications, and/or packages that rely on the outputs of the software release. The information about the dependencies may include, for each dependency, a program increment identifier, an asset name, an asset criticality identifier, an asset business owner identifier, an asset technology owner identifier, a system integrator (SI) identifier, a program name identifier, and/or an agile practice identifier.

Figure 7:
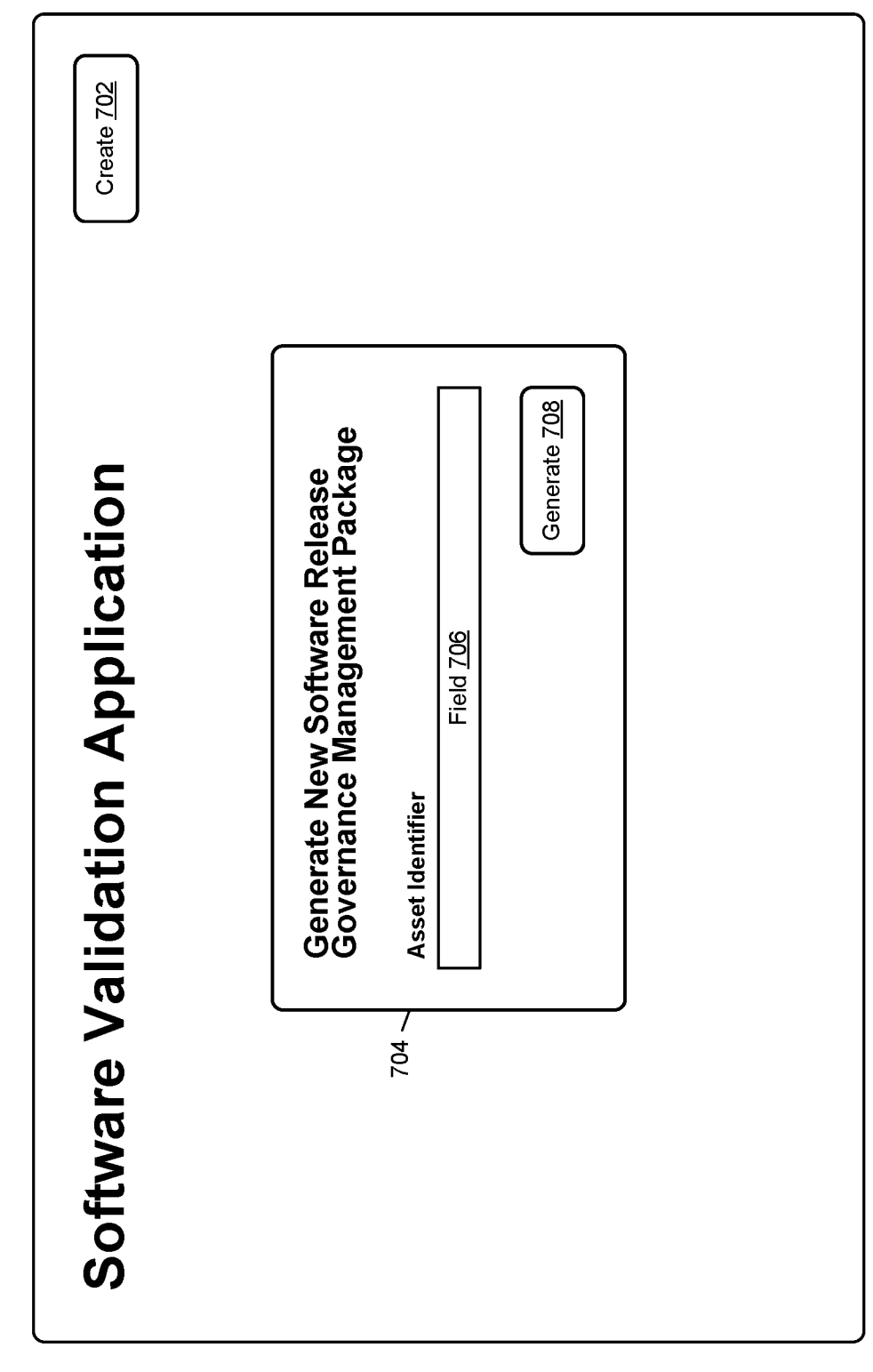
FIGS. 7-23 are diagrams illustrating aspects of an example graphical user interface generated by a software validation application of a software release validation platform.

In the message sequence chart 500, the user accesses the source code release validation platform 108 from the developer device 102 and commands the software release validation platform 108 to generate a software release governance management package for the software release (at operation 504). For example, the software validation application 308 generates a graphical user interface for the software release governance management package, and the user accesses the graphical user interface from the developer device 102 (via the communications system 116). FIGS. 7-23 are diagrams illustrating aspects of an example graphical user interface 700 generated by the software validation application 308 for the software release governance management package. As illustrated in FIG. 7, the user may select a "Create" button 702. In response to the user selecting the "Create" button 702, the software validation application 308 generates a window 704 containing a field 706 and a button 708. The field 706 may be a text box where the user can enter alphanumeric strings. The user may enter the asset identifier of the software release into field 706 and select the "Generate" button 708.

Figure 8:
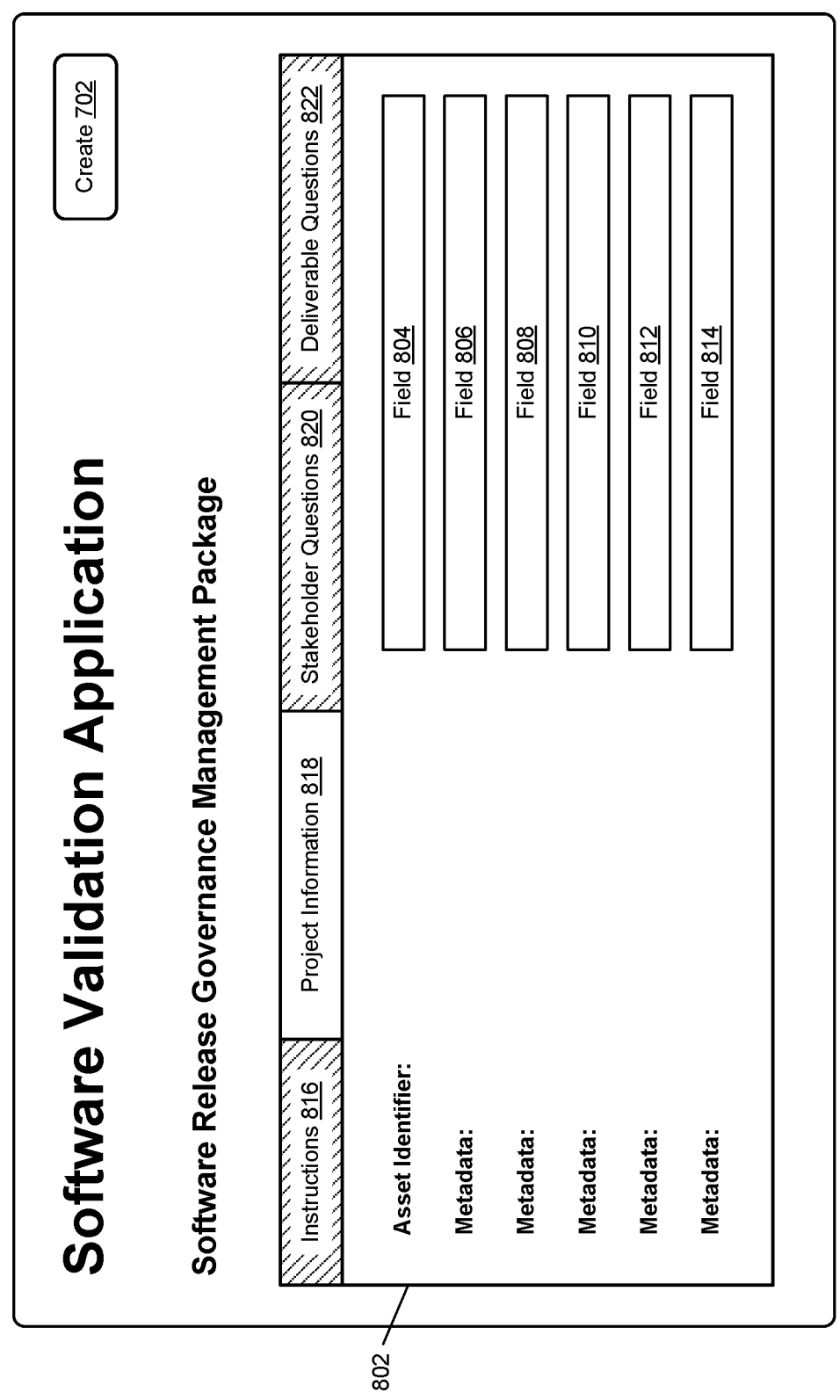

In response to the user selecting the "Generate" button 708, the software validation application 308 parses the metadata in the software management data store 106 associated with the asset identifier input into field 706. As shown in FIG. 8, the software validation application 308 may generate a project information section 802 and populate the project information section 802 with one or more fields 804-814. Each of the fields 804-814 may be display a metadata element associated with the asset identifier (for example, the asset identifier, program increment identifier, asset name, asset criticality identifier, asset business owner identifier, asset technology owner identifier, system integrator (SI) identifier, program name identifier, and/or agile practice identifier). While six fields 804-814 are shown in the example of FIG. 8, the project information section 802 may include any number of fields displaying any combination of metadata elements.

In various implementations, the graphical user interface 700 may include one or more selectable tabs, such as an "Instructions" tab 816, a "Project Information" tab 818, a "Stakeholder Questions" tab 820, and/or a "Deliverable Questions" tab 822. The software validation application 308 may generate an instructions window in response to the user selecting the "Instructions" tab 816, return to the project information section 802 in response to the user selecting the "Project Information" tab 818, generate a stakeholder questions window in response to the user selecting the "Stakeholder Questions" tab 820, and/or generate a deliverable questions window in response to the user selecting the "Deliverable Questions" tab 822.

Figure 9:
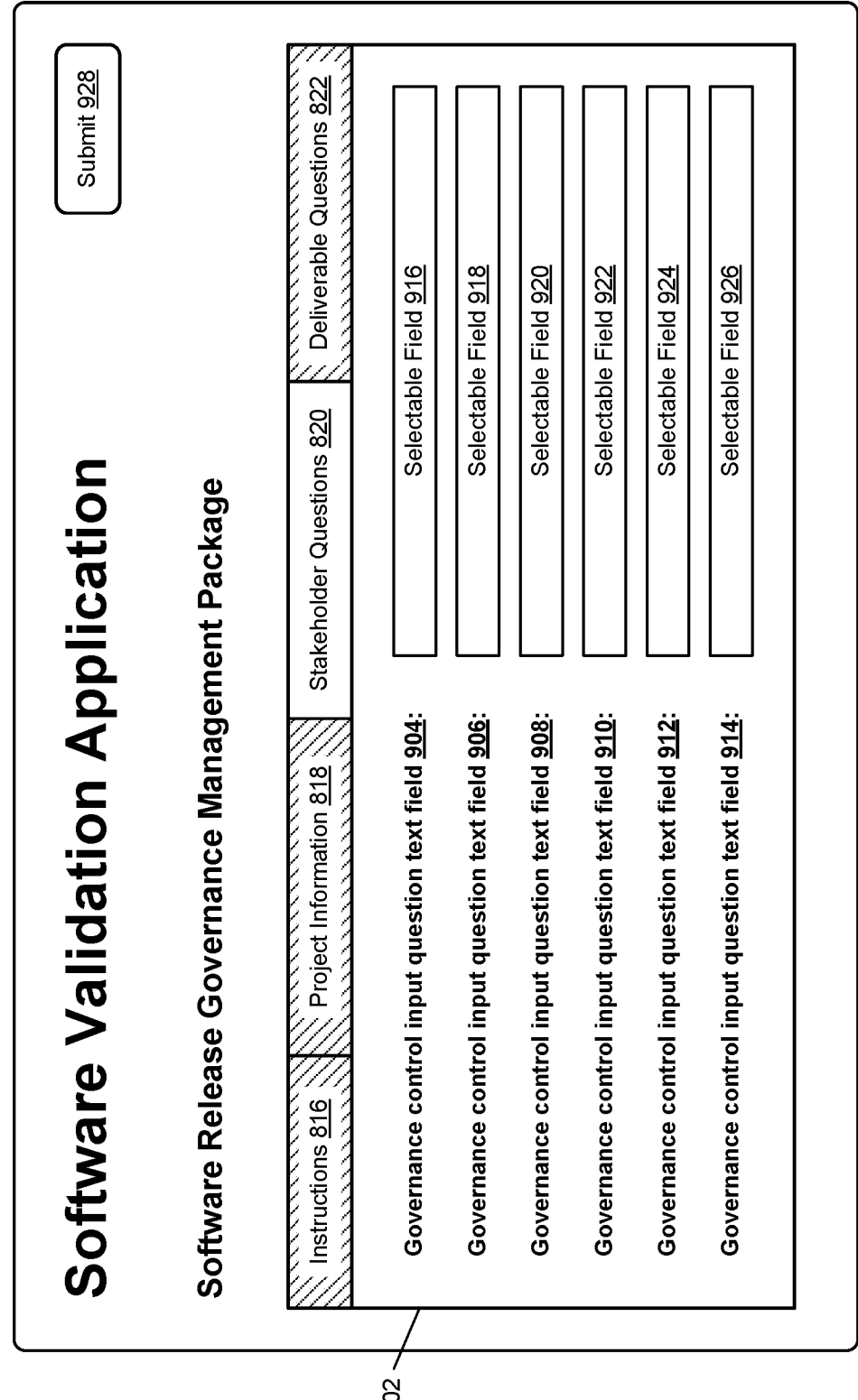
Figure 10:
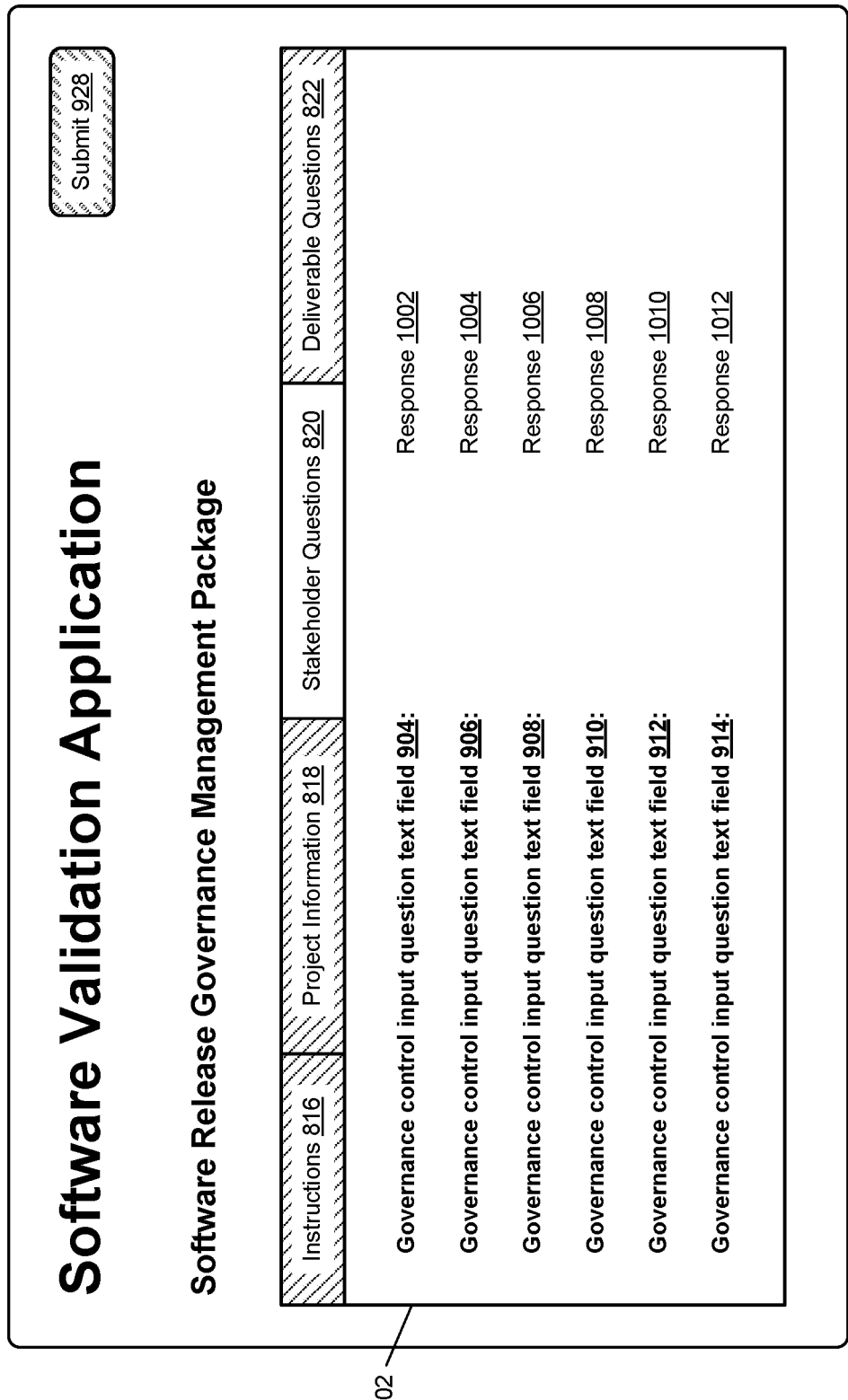

Returning to FIG. 5, in the message sequence chart 500, the software release validation platform 108 generates one or more governance control input fields (at operation 506). As shown in FIG. 9, the software validation application 308 may retrieve one or more governance control input questions from the software management data store 106. The software validation application 308 populates the stakeholder questions section 902 (accessible by the user selecting the "Stakeholder Questions" tab 820) with each of the governance control input questions. For example, the software validation application 308 generates a text field 904-914 based on each governance control input question. The software validation application 308 may also generate a selectable field 916-926 associated with each text field 904-914. Each selectable field 916-926 may be a drop-down list with one or more selectable items (for example, yes, no, and/or a specific answer).

Returning to FIG. 5, the user may access the software release validation platform 108 and populate the input field for each governance control input question (at operation 508). For example, the user may select a selectable item at each selectable field 916-926 to answer the governance control input question associated with the respective governance control input question text field 904-914. After selecting a selectable item at each selectable field 916-926, the user may select a "Submit" button 928. In response to the user selecting the "Submit" button 928, the software validation application 308 saves the selected item in each of the fields 916-926 as a saved response 1002-1012 (shown in FIG. 10) associated with a respective governance control input question. Although six governance control input question text fields 904-914 and six associated selectable fields 916-926 and responses 1002-1012, the software validation application 308 may generate any number of governance control input text fields, selectable fields, and responses (for example, based on the number of governance control input questions present in the software management data store 106).

Returning to FIG. 5, in the message sequence chart 500, the software release validation platform 108 generates governance controls based on the governance control input field values (at operation 510). In various implementations, the software management data store 106 includes a governance control associated with the answer to each governance control input question. The software release validation platform 108 parses the software management data store 106 and determines the governance controls it needs to generate based on the values of the responses 1002-1012. In some examples, the software release validation platform 108 may determine that a governance control is not required for one or more of the responses 1002-1012. In various implementations, the governance controls may require a user to provide one or more governance artifacts. The governance artifacts may be documents, records, or other types of evidence or files that demonstrate the software release's compliance with governance controls. For example, the governance artifacts may include requirements documentation, design documents, code review reports, test plans/test cases, test results/defect logs, change management records, release notes, deployment plans, incident/problem management logs, compliance reports, security audit reports, user acceptance testing documentation, and/or training materials, etc.

Requirements documentation may include detailed descriptions of software requirements, including specifications for the software release. Design documents may outline the software release's architecture, design decisions in implementing the software release, and/or system models for the software release. Code review reports may include records of code reviews (for example, performed manually or using automated code review applications) and identify issues with code quality, adherence to coding standards, and potential security vulnerabilities. Test plans/test cases may include detailed plans for testing the software release, including test cases, testing methodologies, and testing criteria. Test results/defect logs may include records of tests executed on the software release and/or logs of any defects or issues found. Change management records may include documentation of changes made to the software release and may include change requests, approval records, and/or logs of the implemented changes.

Release notes may include documentation outlining new features, bug fixes, and known issues addressed by the software release. Deployment plans may include detailed plans for deploying the software release. Incident/problem management logs may include records of any incidents or problems encountered during the development process of the software release and resolution of the incidents or problems. Compliance reports may include documentation demonstrating the software release's compliance with industry standards, legal requirements, and/or other policies.

Security audit reports may include results from security audits or assessments performed on the software release, including any potential vulnerabilities identified and the measures taken to address them. User acceptance testing documentation may include records of testing performed by end-users to validate the software release. Training materials may include documents or guides for training users on the software release (for example, on the new features or changes introduced in the software release).

Figure 11:
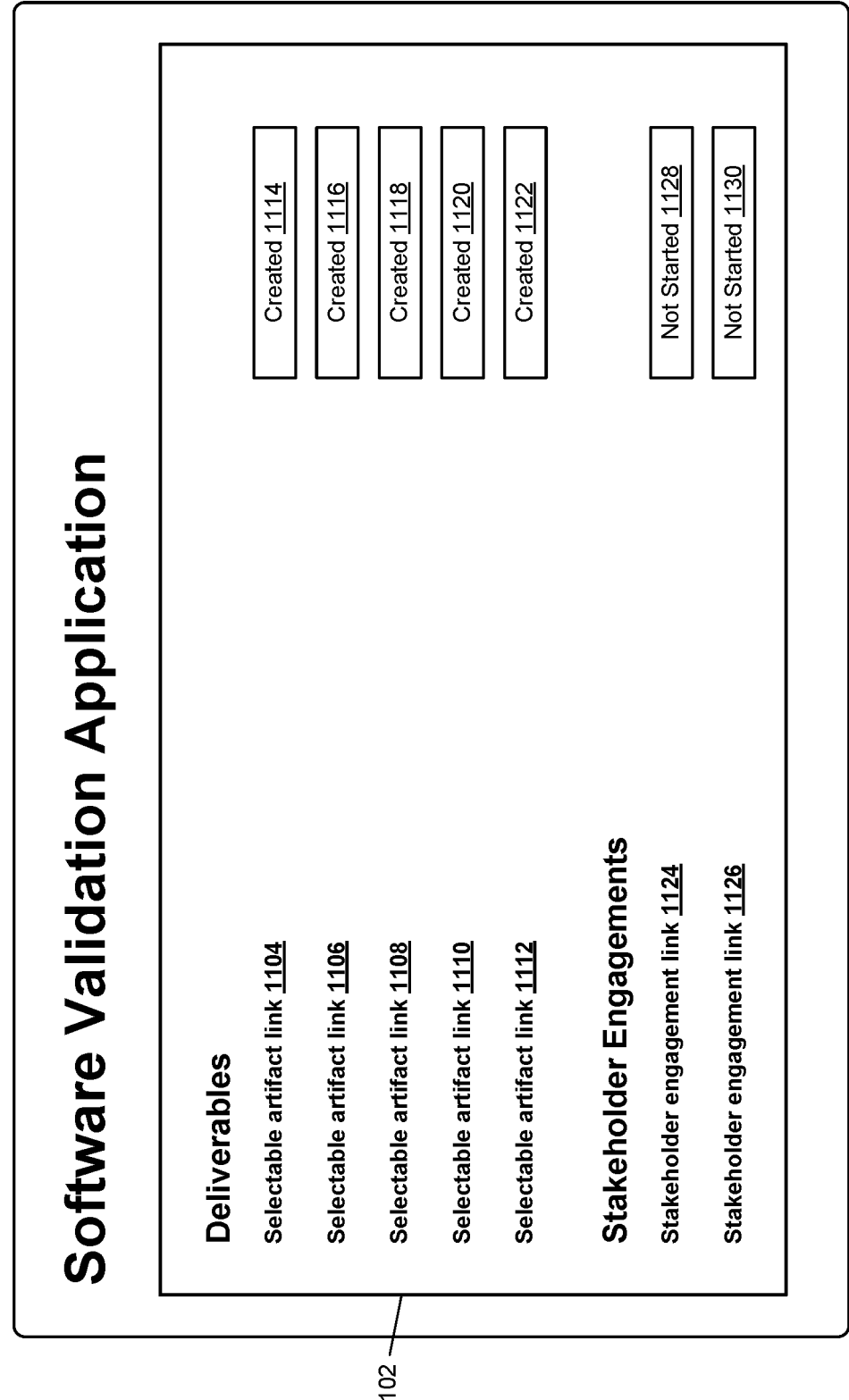

As shown in FIG. 11, the software validation application 308 generates a deliverables and stakeholder engagements section 1102 at the graphical user interface 700. The software validation application 308 generates a selectable artifact link 1104-1112 for each generated governance control along with an associated status indicator 1114-1122 for each respective selectable artifact link 1104-1112. Although five selectable artifact links 1104-1112 and five associated status indicators 1114-1122 are shown in FIG. 11, the software validation application 308 may generate any number of selectable artifact link and associated status indicators (corresponding with the number of automatically generated governance artifacts).

Returning to FIG. 5, in the message sequence chart 500, the software validation application 308 generates stakeholder engagement fields at the graphical user interface 700 (at operation 512). For example, the software validation application 308 parses the metadata in the software management data store 106 to determine dependencies associated with the asset identifier of the software release. The software validation application 308 may generate a stakeholder engagement link 1124-1126 in the deliverables and stakeholder engagements section 1112 of the graphical user interface 700 corresponding to each dependency. The software validation application 308 may also generate an associated status indicator 1128-1130 for each stakeholder engagement link 1124-1126. Although two stakeholder engagement links 1124-1126 and two associated status indicators 1128-1130 are shown in FIG. 11, the software validation application 308 may generate any number of selectable stakeholder engagement links and associated status indicators (corresponding with the number of dependencies indicated by the metadata for the asset identifier of the software release).

Figure 12:
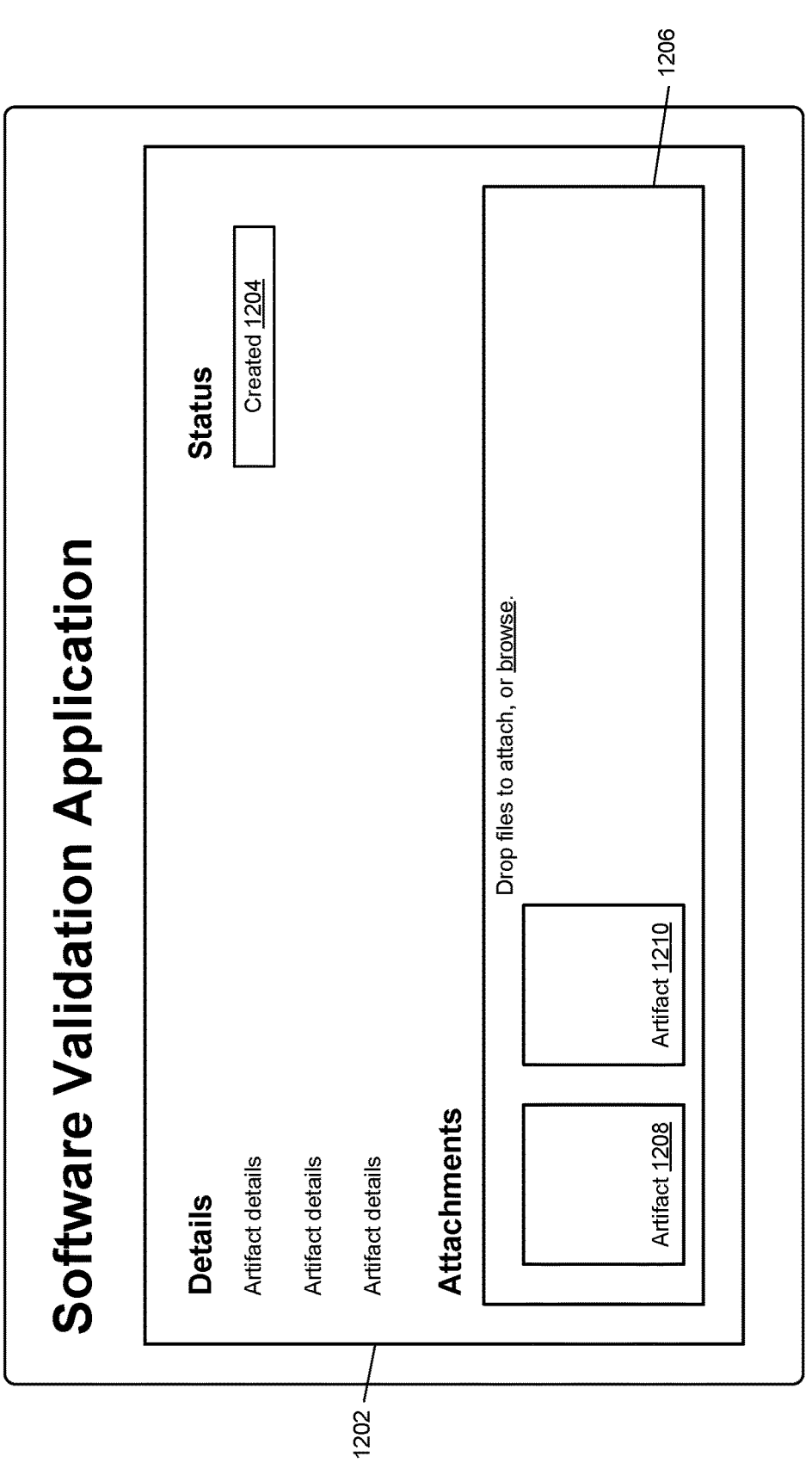
Figure 13:
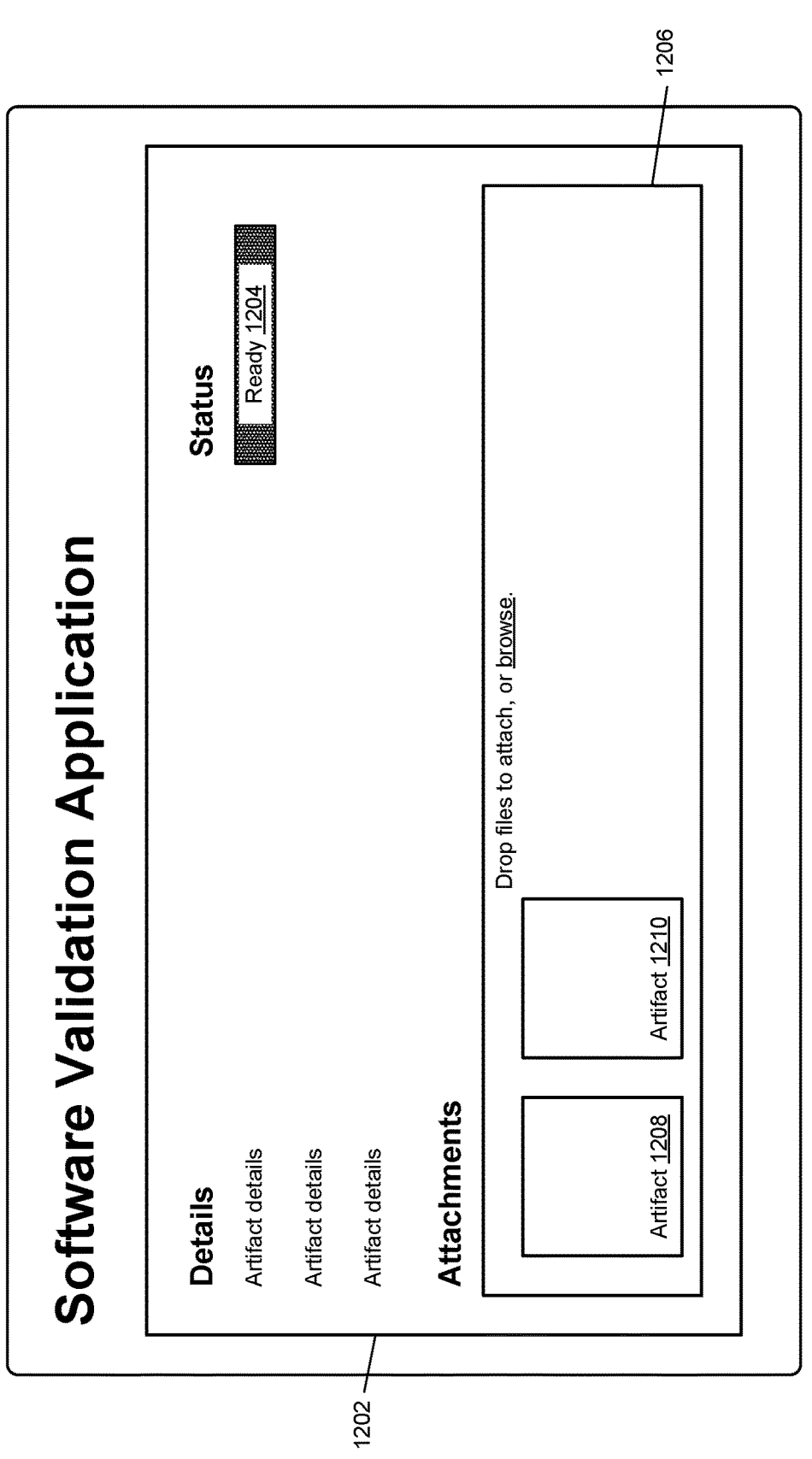
Figure 14:
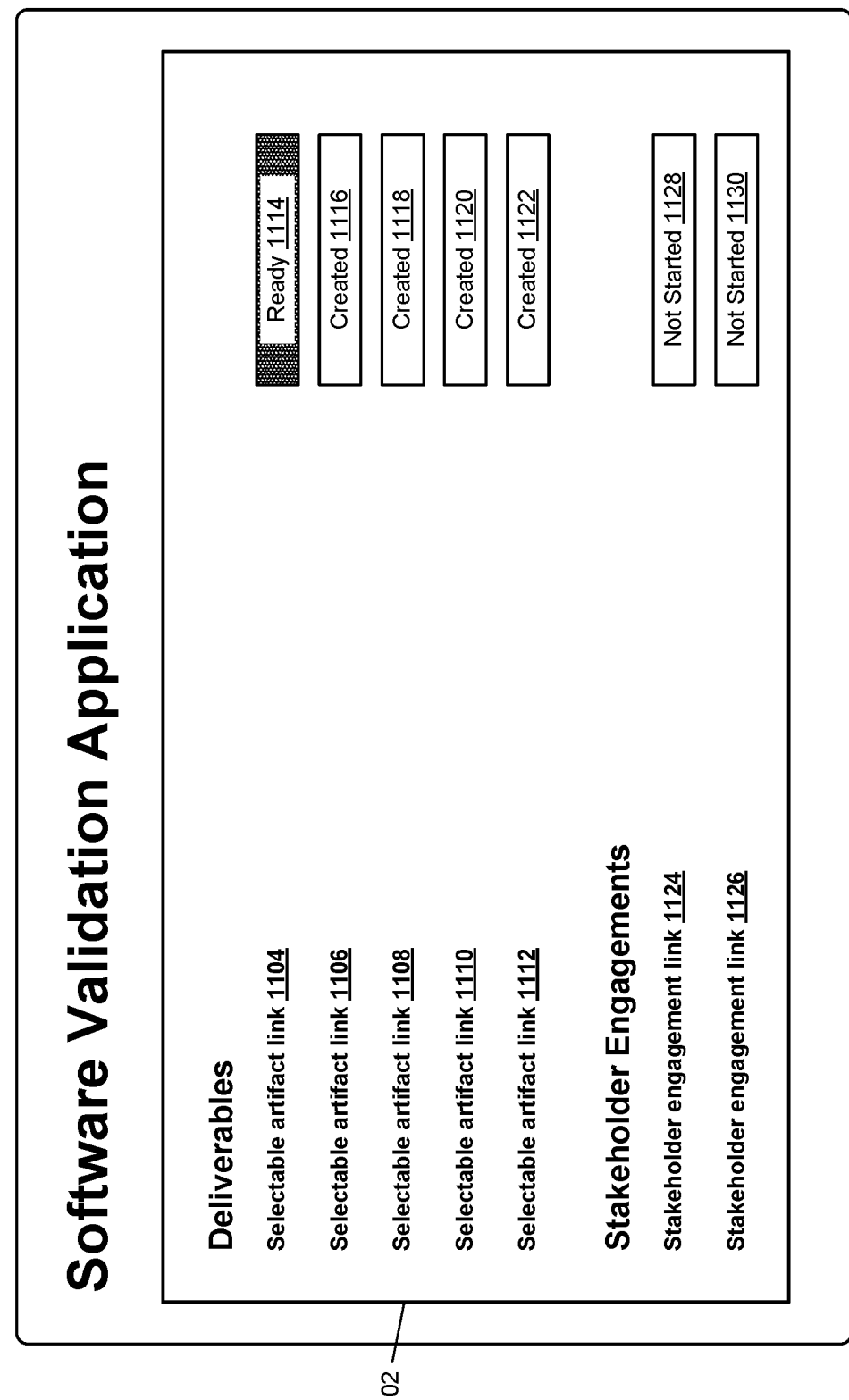
Figure 15:
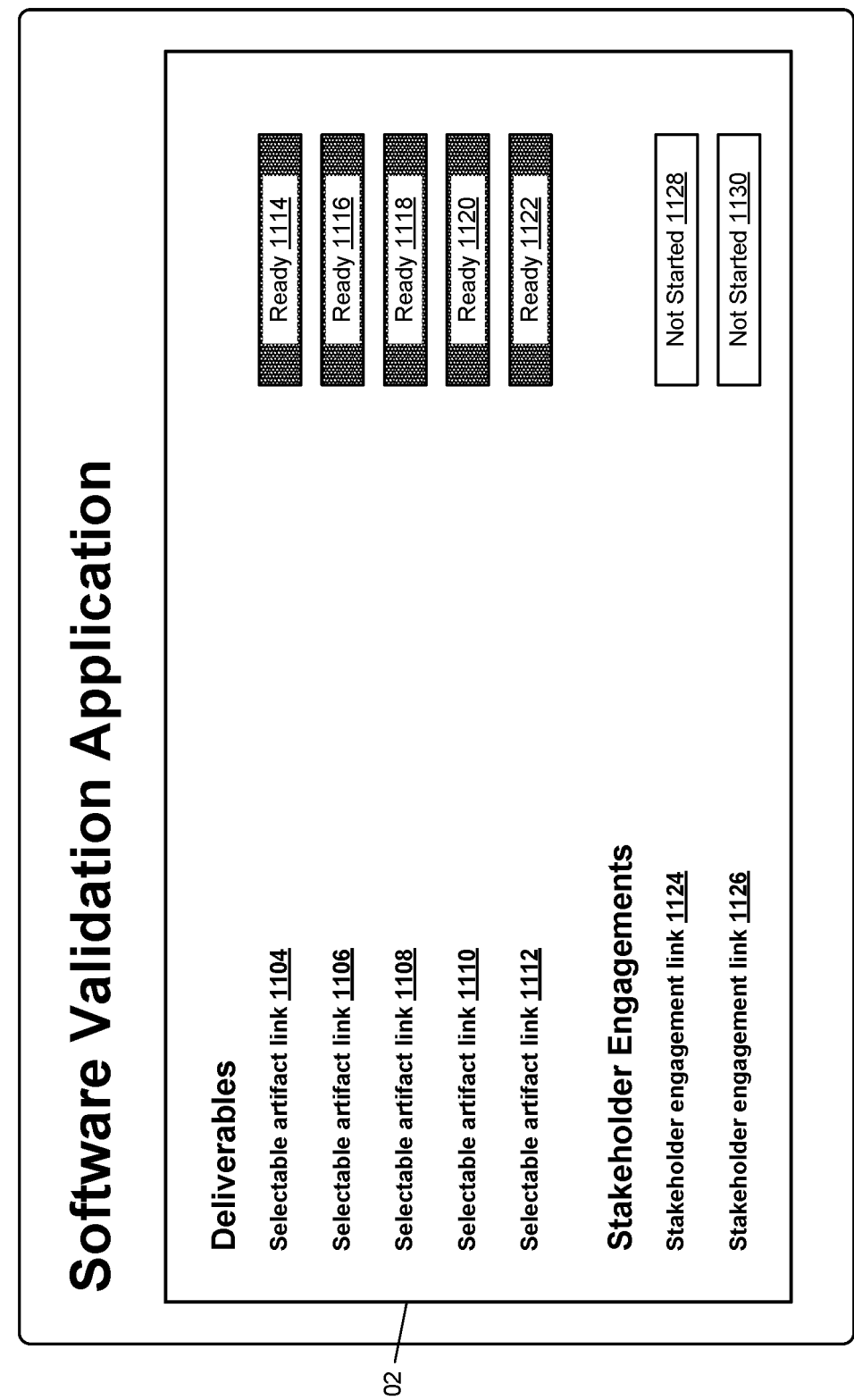
Figure 16:
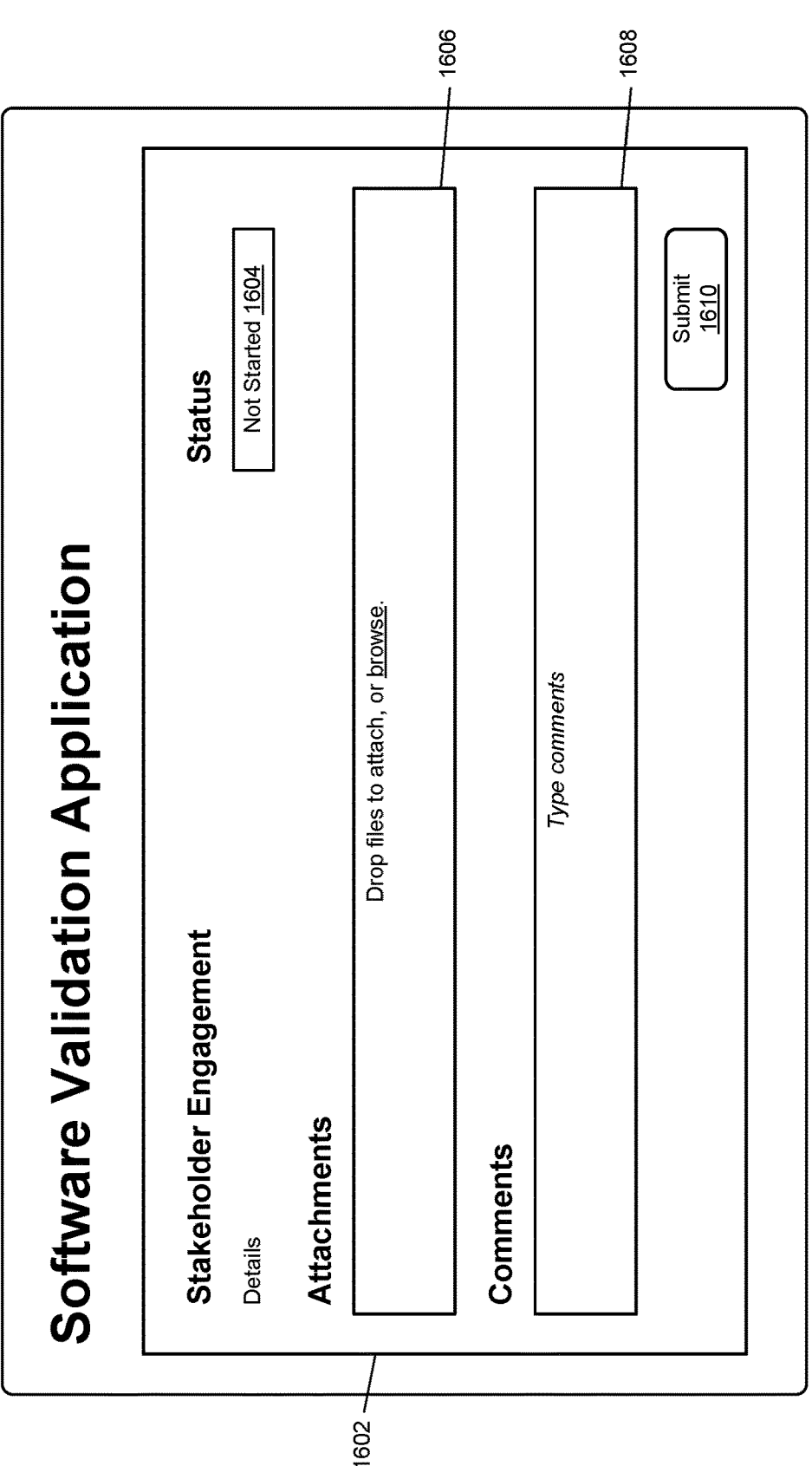
Figure 17:
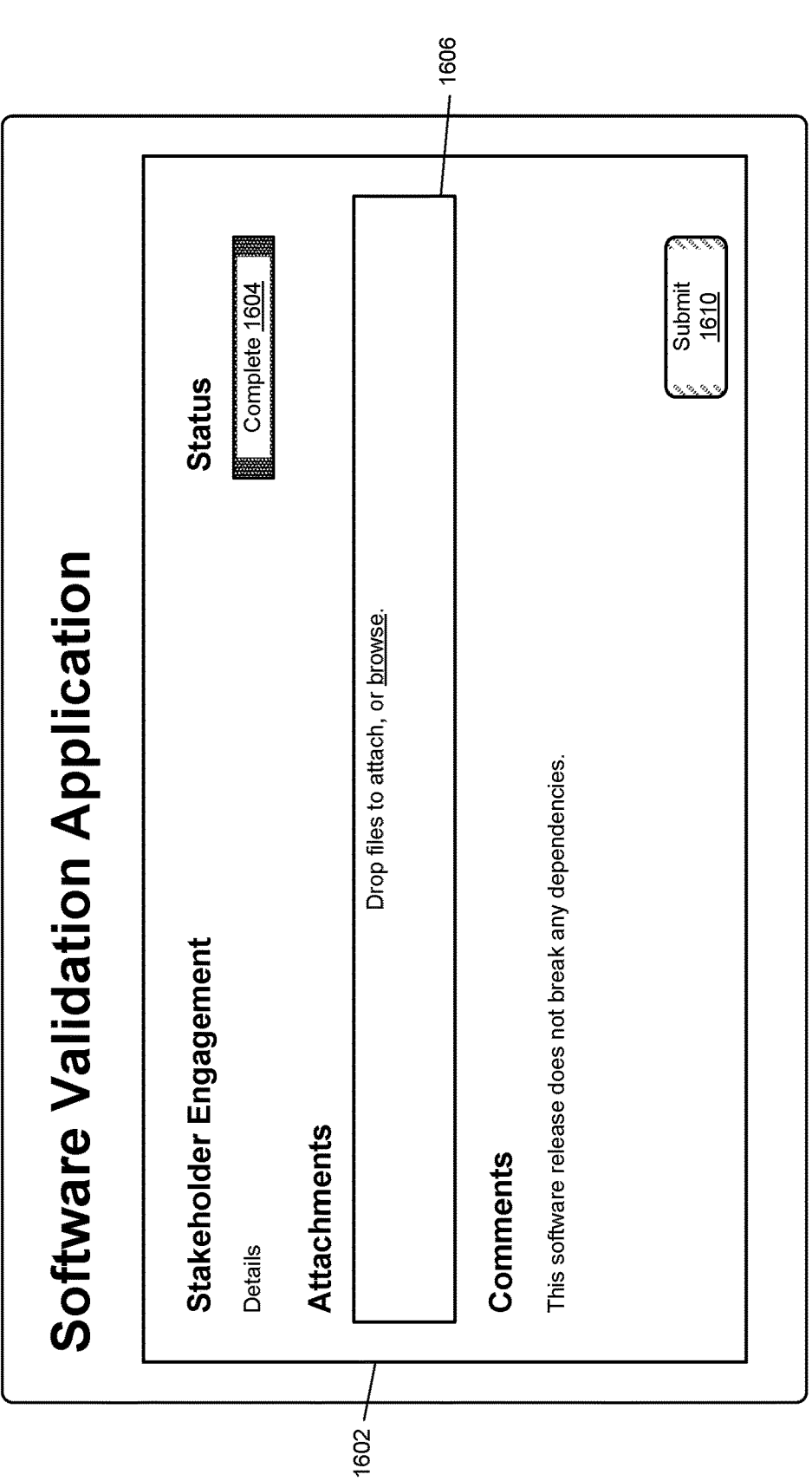
Figure 18:
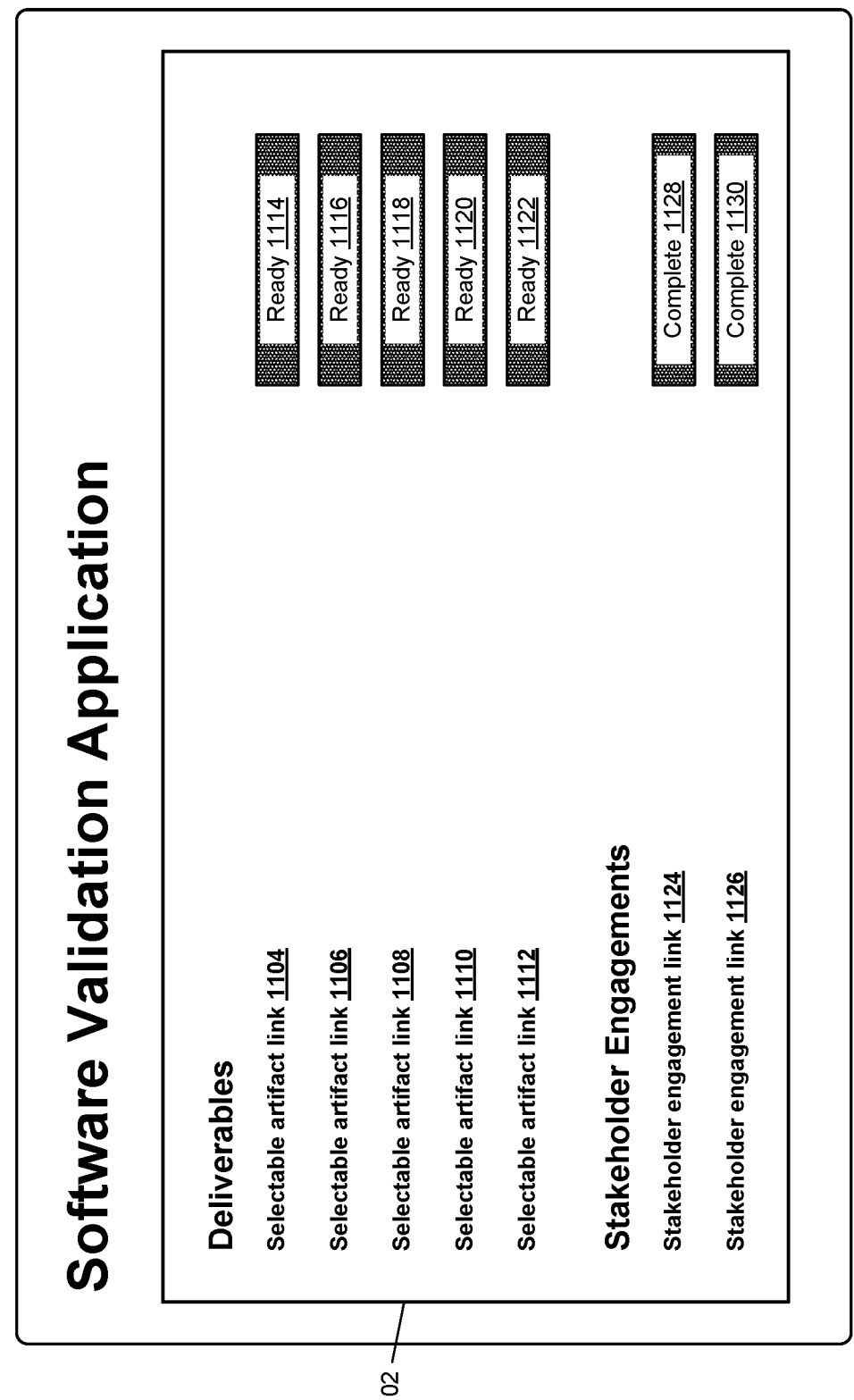

Returning to FIG. 5, in the message sequence chart 500, the user may access the software release validation platform 108 from the developer device 102 and populate the governance control (at operation 514). For example, the user may select one of the selectable artifact links 1104-1112 from the deliverables and stakeholder engagements section 1102 of the graphical user interface 700. In response to the user selecting one of the selectable artifact links 1104-1112, the software validation application 308 generates a governance artifact screen 1202 (shown in FIG. 12). The governance artifact screen 1202 corresponds to the governance control associated with the selected one of the selectable artifact links 1104-1112 and displays details about the governance control. The governance artifact screen 1202 includes a status indicator 1204 and an attachments upload area 1206. The user may upload one or more governance artifacts, such as artifact 1208 and artifact 1210, into the upload area 1206 (for example, by dragging and dropping the artifact into the upload area 1206). Although the two artifacts 1208 and 1210 are shown in FIG. 12, the user may upload any number of artifacts into the upload area 1206.

After the user uploads the required artifacts into the upload area 1206, the user may update the status of the status indicator 1204. For example, the user may update the status indicator 1204 from "Created" (shown in FIG. 12) to "Ready" (shown in FIG. 13). In various implementations, the user may also update the status indicator 1204 to "In Progress" (not shown). In response to the user updating the status indicator 1204 at the governance artifact screen 1202, the software validation application 308 updates the corresponding status indicator at the deliverables and stakeholder engagements section 1102. For example, in the scenario that the governance artifact screen 1202 was generated in response to the user selecting selectable artifact link 1104, then the software validation application 308 updates status indicator 1114 to "Ready" (shown in FIG. 14) in response to the user changing the status indicator 1204 to "Ready" at the governance artifact screen 1202. The user may access each selectable artifact link 1104-1112, upload the required artifacts at the governance artifact screen generated for each selectable artifact link 1104, and update status indicator at the governance artifact screen after the required artifacts are updated. After all the status indicators are updated to "Ready," all of the status indicators 1114-1122 at the deliverables and stakeholder engagements section 1102 will also be updated to "Ready" (shown in FIG. 15).

Returning to FIG. 5, in the message sequence chart 500, the software release validation platform 108 automatically generates and transmits a notification to the stakeholder device 110 (at operation 516). For example, the software validation application 308 may generate a notification to each stakeholder associated with each stakeholder engagement link 1124-1126 of the deliverables and stakeholder engagements section 1102 and transmit the notification to the respective stakeholder device via the communications system 116. Each notification may include a link for the stakeholder to access the respective stakeholder engagement link 1124-1126. In the message sequence chart 500, the stakeholder accesses the software release validation platform 108 from the stakeholder device 110 and populates the stakeholder engagement fields (at operation 518). For example, the stakeholder accesses the link transmitted in the notification at operation 516 or selects the corresponding stakeholder engagement link from the deliverables and stakeholder engagements section 1102 of the graphical user interface 700. In response to the stakeholder accessing the link, the software validation application 308 generates a stakeholder engagement screen 1602 (shown in FIG. 16).

The stakeholder engagement screen 1602 may include relevant details for the stakeholder, a status indicator 1604, an attachment upload area 1606, and a comments field 1608. The stakeholder may drag and drop files into the attachment upload area 1606 for upload to the stakeholder engagement screen 1602 and/or type comments into the comments field 1608. After the stakeholder types comments into the comments field 1608, the stakeholder may select the "Submit" button 1610. In response to the stakeholder selecting the "Submit" button 1610, the comments entered into the comments field 1608 are posted to the stakeholder engagement screen 1602 (shown in FIG. 17). After the stakeholder completes work on the stakeholder engagement screen 1602 and/or reviews the uploaded artifacts (for example, accessed via the selectable artifact links 1104-1112 on the deliverables and stakeholder engagements section 1102), the stakeholder may select the status indicator 1604 and change its status. In various implementations, the status indicator 1604 may indicate a status of "Not Started," "Not Required," "In Progress," "Engagement Complete—with Observations," or "Engagement Complete—No Observations." After each stakeholder completes work on their respective stakeholder engagement screen and updates the status indicator on that screen, the software validation application 308 automatically updates the corresponding status indicators 1128-1130 in the deliverables and stakeholder engagements section 1102 (shown in FIG. 18).

Referring to FIG. 6, in the message sequence chart 500, the user accesses the software release deployment platform 112 via the developer device 102 (at operation 520). For example, the user accesses the software deployment application 408 via the communications system 116 and commands the software deployment application 408 to deploy the initiate deployment of the software release to the production platform 114. In the message sequence chart 500, the software release deployment platform 112 accesses the software release governance management package for the software release at the software release validation platform 108 (at operation 522). For example, the software deployment application 408 sends a request to the software validation application 308 via the communications system 116 to access the software release governance management package.

In the message sequence chart 500, the software release deployment platform 112 parses the governance controls and the stakeholder engagement fields of the software release governance management package (at operation 524). For example, the software deployment application 408 checks each status indicator 1114-1122 associated with each governance control and checks each status indicator 1128-1130 associated with each stakeholder engagement field to determine whether each status indicator is in a "Complete" status. In various implementations, a status indicator may be in a "Complete" status when it indicates "Ready," "Not Required," "Engagement Complete—with Observations," or "Engagement Complete—No Observations."

In the message sequence chart 500, in response to the software release deployment platform 112 determining that the governance controls and stakeholder engagement fields of the software release governance management package are complete (at operation 524), the software release deployment platform 112 retrieves the source code of the software release from the source code repository platform 104 (at operation 526). For example, the software deployment application 408 requests the source code from the source code repository application 208, and the source code repository application 208 retrieves the source code from the source code repository 210 and transmits the source code to the software release deployment platform 112 via the communications system 116.

In the message sequence chart 500, in response to the software release deployment platform 112 determining that the governance controls and stakeholder engagement fields of the software release governance management package are complete (at operation 524), the software release deployment platform compiles the source code (at operation 528). For example, the software deployment application 408 compiles the retrieved source code. In the message sequence chart 500, in response to the software release deployment platform 112 determining that the governance controls and stakeholder engagement fields of the software release governance management package are complete (at operation 524), the software release deployment platform 112 deploys the compiled software release to the production platform 114. For example, the software deployment application 408 transmits the compiled software release to the production platform 114 via the communications system 116.

In the message sequence chart 500, in response to the software release deployment platform 112 determining that the governance controls and stakeholder engagement fields of the software release governance management package are not complete (at operation 524), the software release deployment platform 112 transmits an error message to the developer device 102. For example, the software deployment application 408 generates an error message indicating that the governance controls have not been fully implemented for the software release and transmits the error message to the developer device via the communications system 116.

Figure 19:
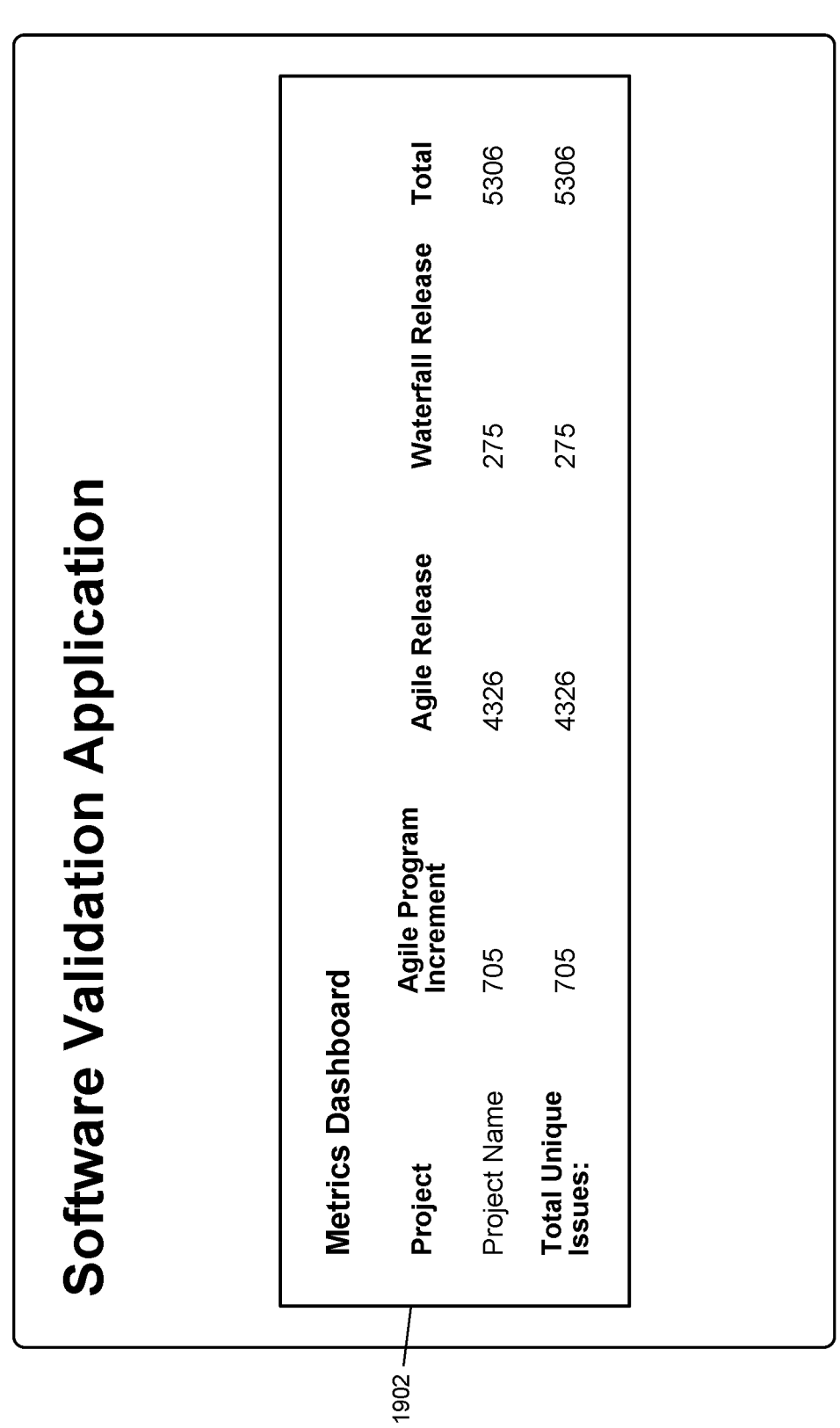

FIG. 19 shows an example metrics dashboard 1902 generated by the software validation application 308 on the graphical user interface 700. For example, the software validation application 308 may analyze the software release governance management packages for all software releases processed by the software validation application 308 or the software release validation platform 108 and generate one or more metrics. In various implementations, the metrics may include, for each project (e.g., a single software release or a group of multiple software releases), a number of agile program increments present, a number of software releases successfully deployed via agile release methodologies, a number of software releases successfully deployed via waterfall release methodologies, and a total of the agile program increments, software releases deployed via agile release, and software releases deployed via waterfall release. In some examples, the one or more metrics may include a total number of each of the previously described metrics for all projects.

Figure 20:
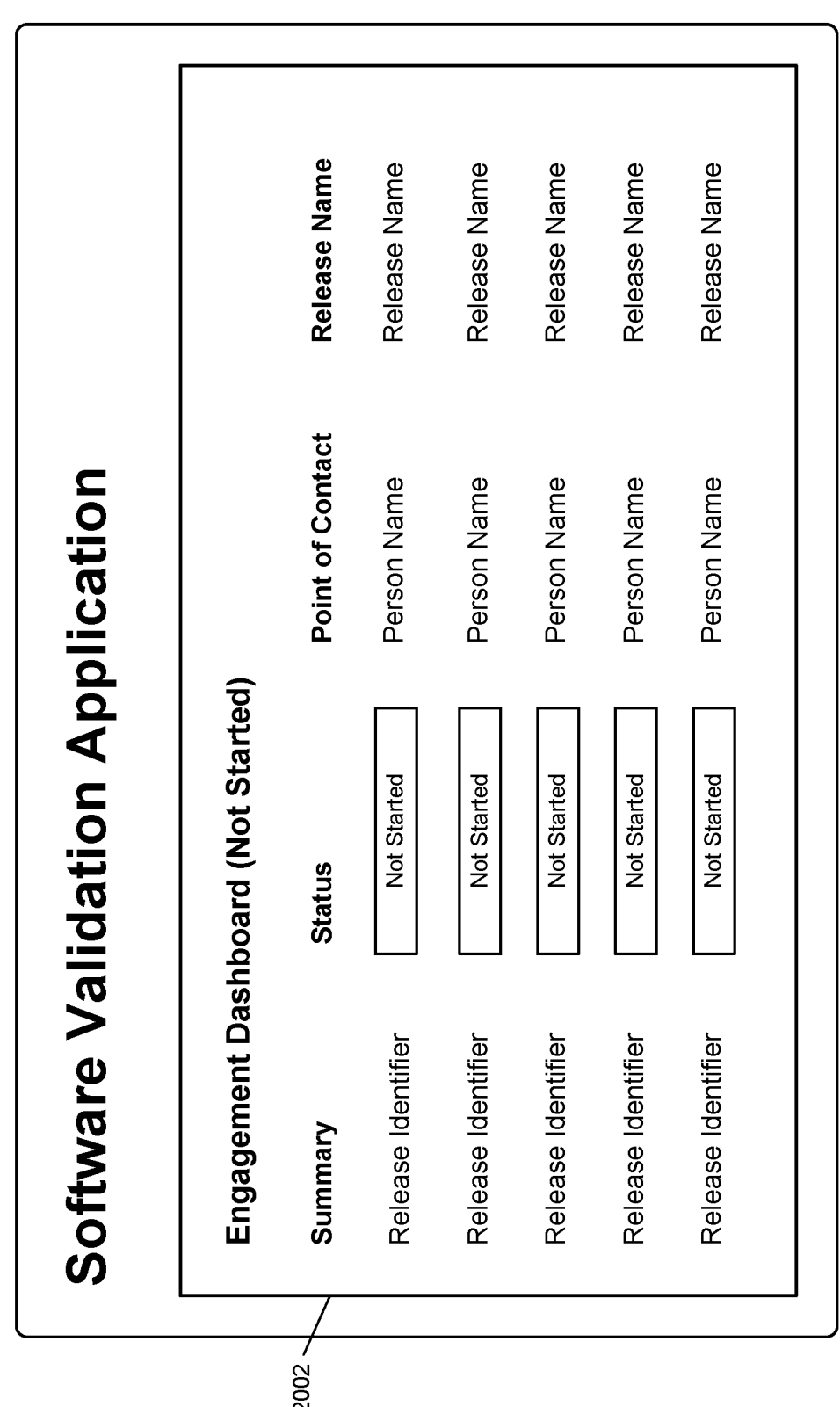

FIG. 20 shows an example engagement dashboard 2002 generated by the software validation application 308 on the graphical user interface 700. For example, the software validation application 308 may analyze each software release governance management package to determine a status of each stakeholder engagement. In various implementations, the software validation application 308 may display each stakeholder engagement having a "Not Started" status on the engagement dashboard 2002.

Figure 21:
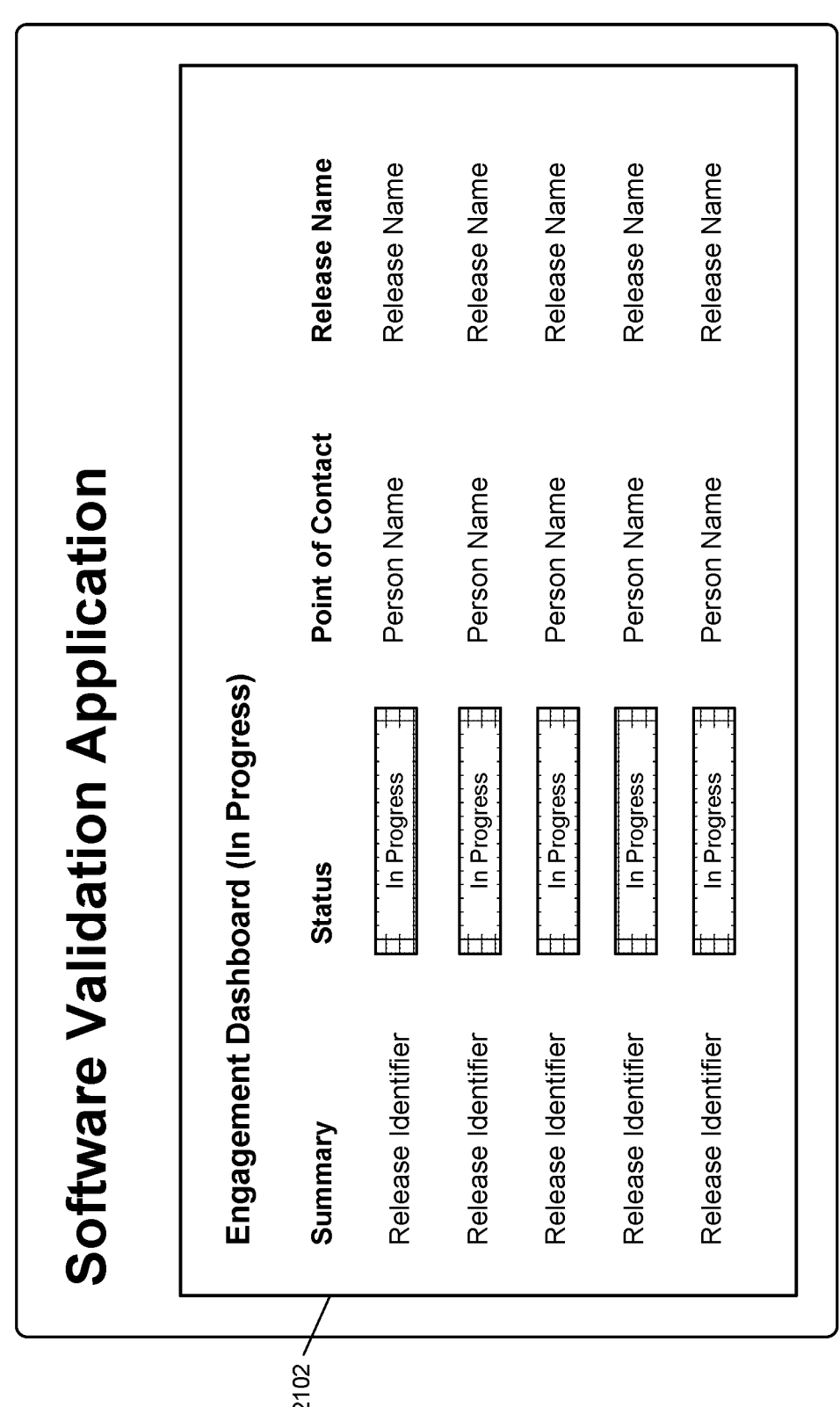

FIG. 21 shows an example engagement dashboard 2102 generated by the software validation application 308 on the graphical user interface 700. For example, the software validation application 308 may analyze each software release governance management package to determine a status of each stakeholder engagement. In various implementations, the software validation application 308 may display each stakeholder engagement having an "In Progress" status on the engagement dashboard 2102.

Figure 22:
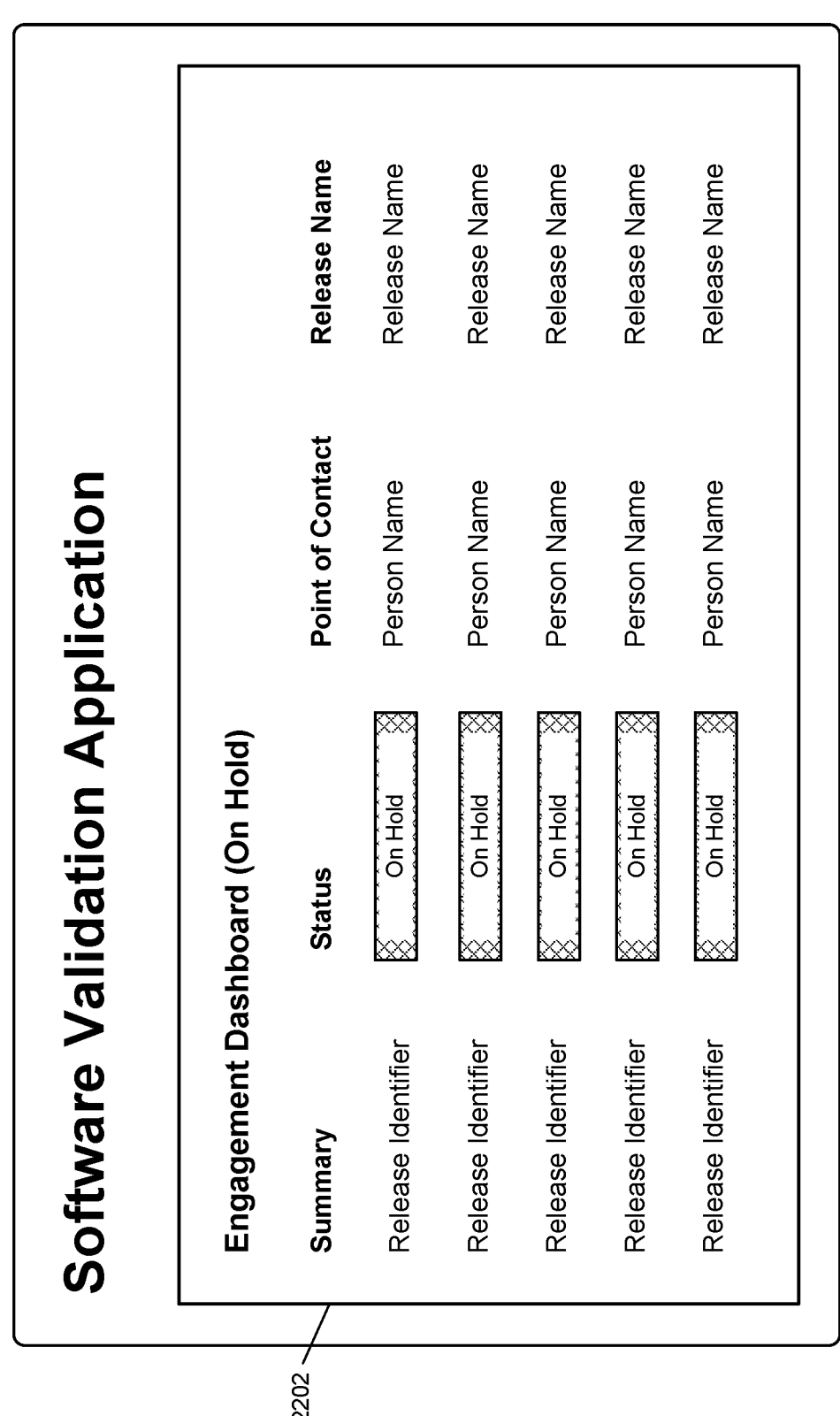

FIG. 22 shows an example engagement dashboard 2202 generated by the software validation application 308 on the graphical user interface 700. For example, the software validation application 308 may analyze each software release governance management package to determine a status of each stakeholder engagement. In various implementations, the software validation application 308 may display each stakeholder engagement having a "On Hold" status on the engagement dashboard 2202.

Figure 23:
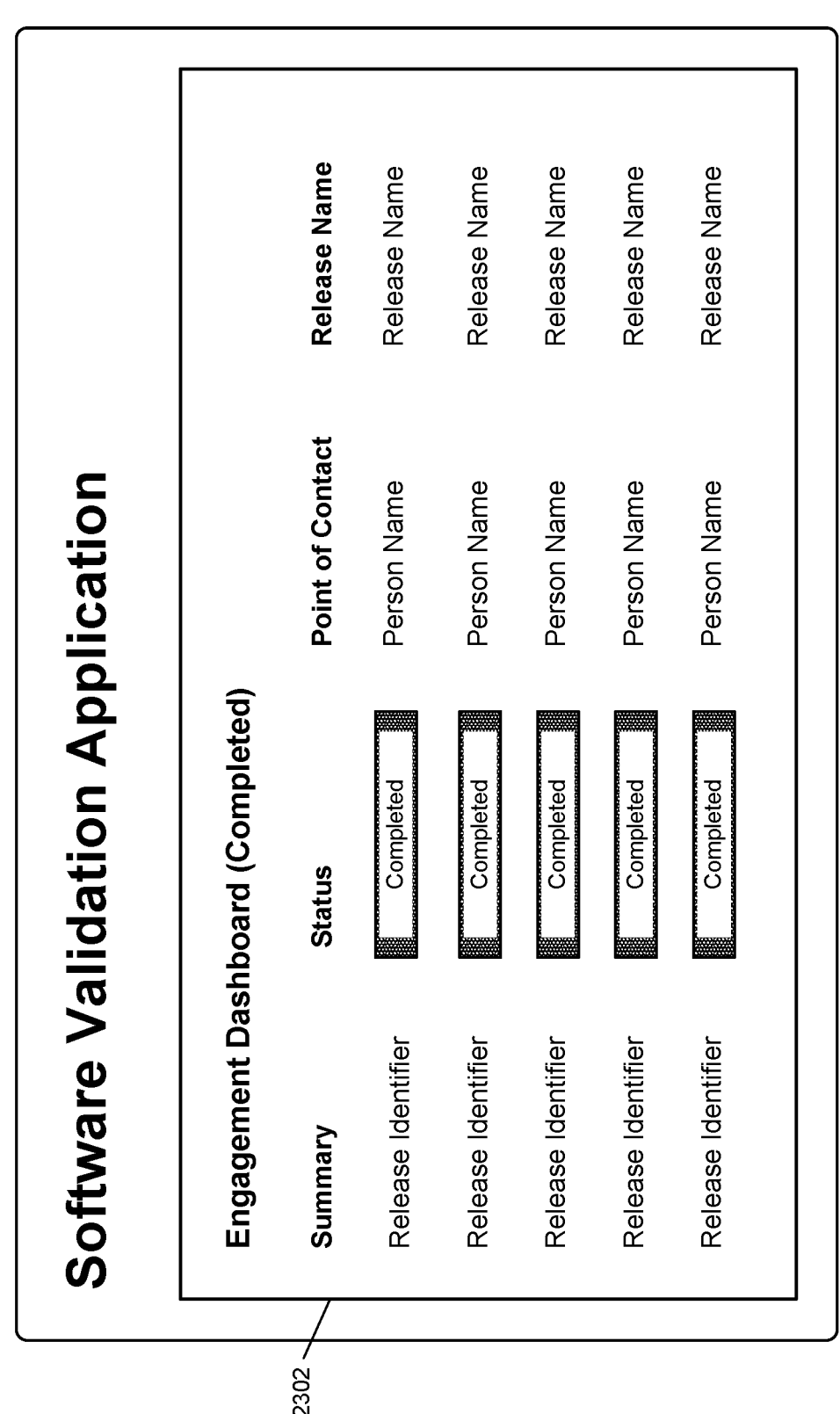

FIG. 23 shows an example engagement dashboard 2302 generated by the software validation application 308 on the graphical user interface 700. For example, the software validation application 308 may analyze each software release governance management package to determine a status of each stakeholder engagement. In various implementations, the software validation application 308 may display each stakeholder engagement having a "Completed" status on the engagement dashboard 2302.

Figure 24:
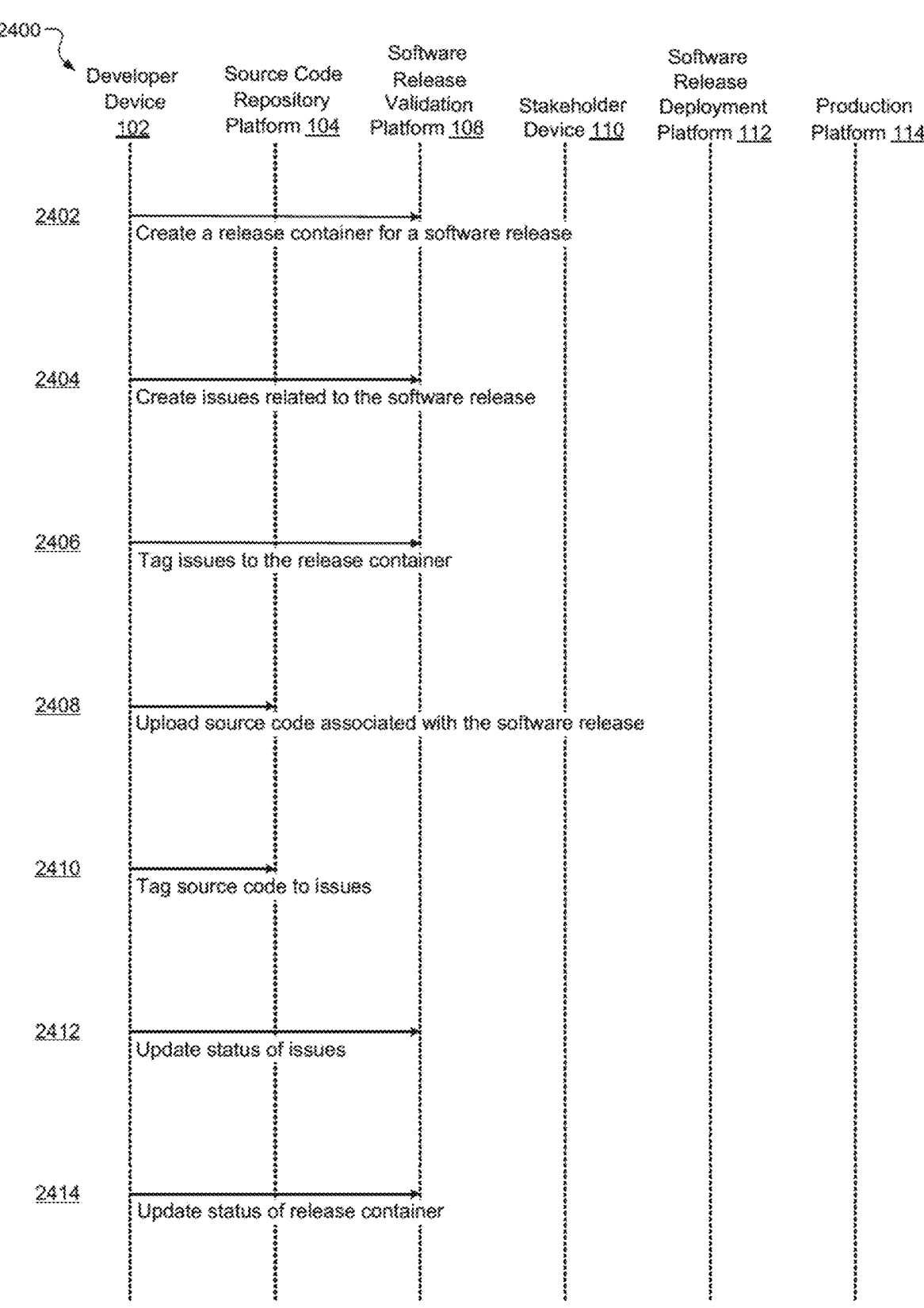
FIGS. 24 and 25 are a message sequence chart illustrating example interactions between components of a computing system as the computing system automatically validates, compiles, and deploys a software release.
Figure 25:
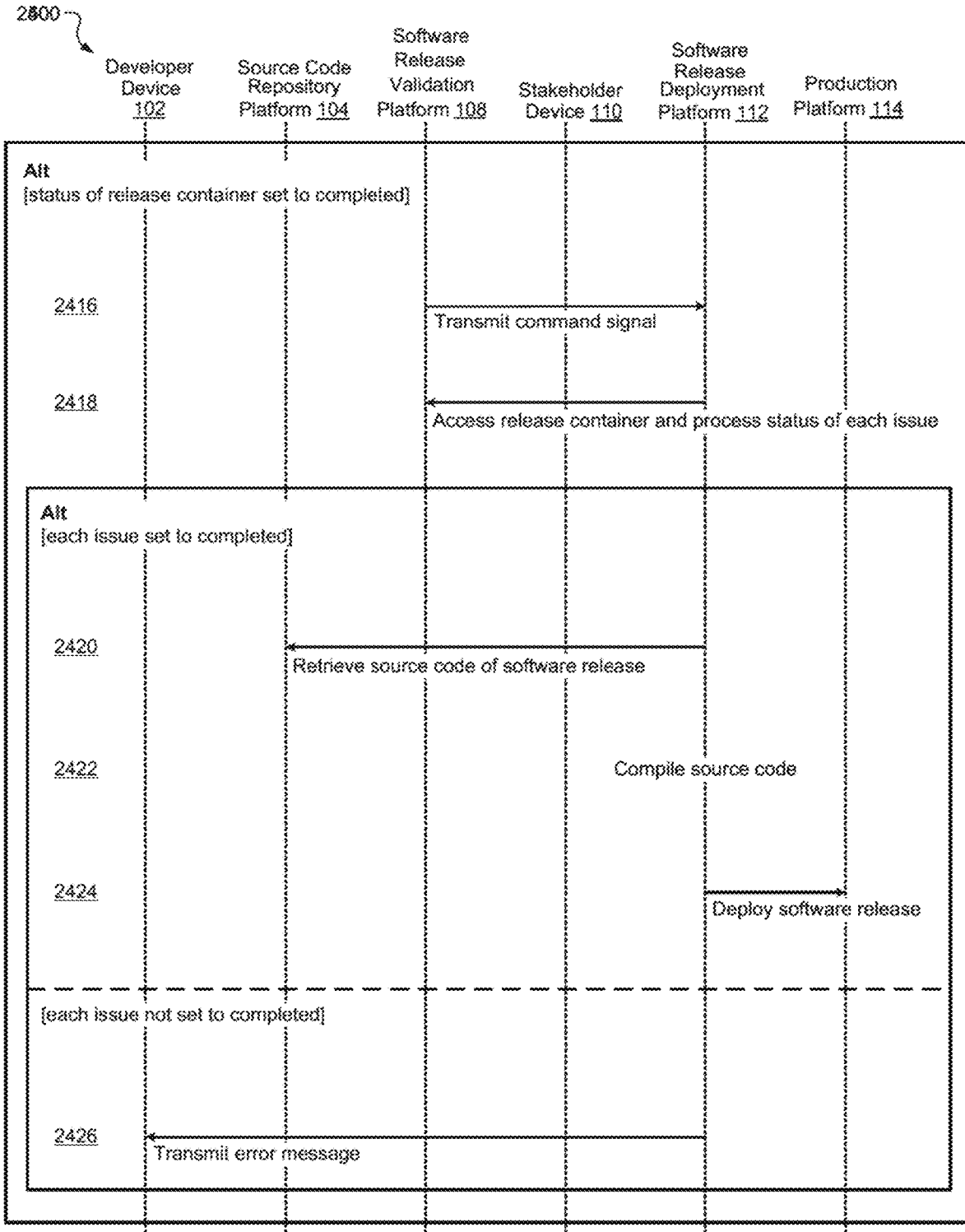

FIGS. 24 and 25 are a message sequence chart 2400 illustrating example interactions between components of the computing system 100 as the computing system 100 automatically validates, compiles, and deploys a software release. In the message sequence chart 2400, the developer device 102 accesses the software release validation platform 108 and creates a release container for a software release (at operation 2402). For example, the developer device 102 accesses a graphical user interface generated by the software validation application 308 via the communications system 116. FIGS. 26-29, 31, and 32 are diagrams illustrating examples of a graphical user interface 2600 generated by the software release validation platform 108 for the release container. As shown in FIG. 26, the graphical user interface 2600 may include a release container creation screen 2602. The release container creation screen 2602 may include one or more fillable fields, such as fields 2604-2642. In various implementation, each of the fields 2604-2642 may include a text box, a text area, a dropdown menu with one or more selectable options, and/or a date picker allowing users to select a date from a calendar or enter a date in a predefined format.

In various implementations, field 2604 allows the user to enter a release name. The release name may be used to identify a particular software release. The software release validation platform 108 may associate the release container with the software release identified by the release name. In some examples, field 2606 allows the user to enter a description for the release container. In various implementations, field 2608 allows the user to enter a start date for the deployment of the software release. In some examples, field 2610 allows the user to enter an end date for the deployment of the software release. In various implementations, field 2612 allows the user to select a primary asset associated with the software release. In some examples, field 2614 allows the user to enter the routine release associated with the release container. In various implementations, field 2616 allows the user to select a secondary asset associated with the software release.

In some examples, field 2618 allows the user to enter an epic identifier for the software release. In various implementations, field 2620 allows the user to select a primary asset name associated with the software release. In some examples, field 2622 allows the user to select a primary program associated with the software release. In various implementations, field 2624 allows the user to select a delivery container associated with the software release. In some examples, field 2626 allows the user to select a primary assignment group associated with the software release. In various implementations, field 2628 allows the user to select a primary template name associated with the software release. In some examples, field 2630 allows the user to select a deployment or production environment associated with the software release.

In various implementations, field 2632 allows the user to enter a business justification for the software release. In some examples, field 2634 allows the user to specify a release type of the software release. In various implementations, field 2636 allows the user to enter comments related to the business justification for the software release. In some examples, field 2638 allows the user to specify a user or entity the software release was requested for. In various implementations, field 2640 allows the user to specify a build ID and/or version of the software release. In some examples, field 2642 allows the user to specify the primary release approver of the software release. After the user populates one or more of fields 2604-2642, the user selects selectable "Create" button 2644 and the software validation application 308 creates the release container.

Figure 27:
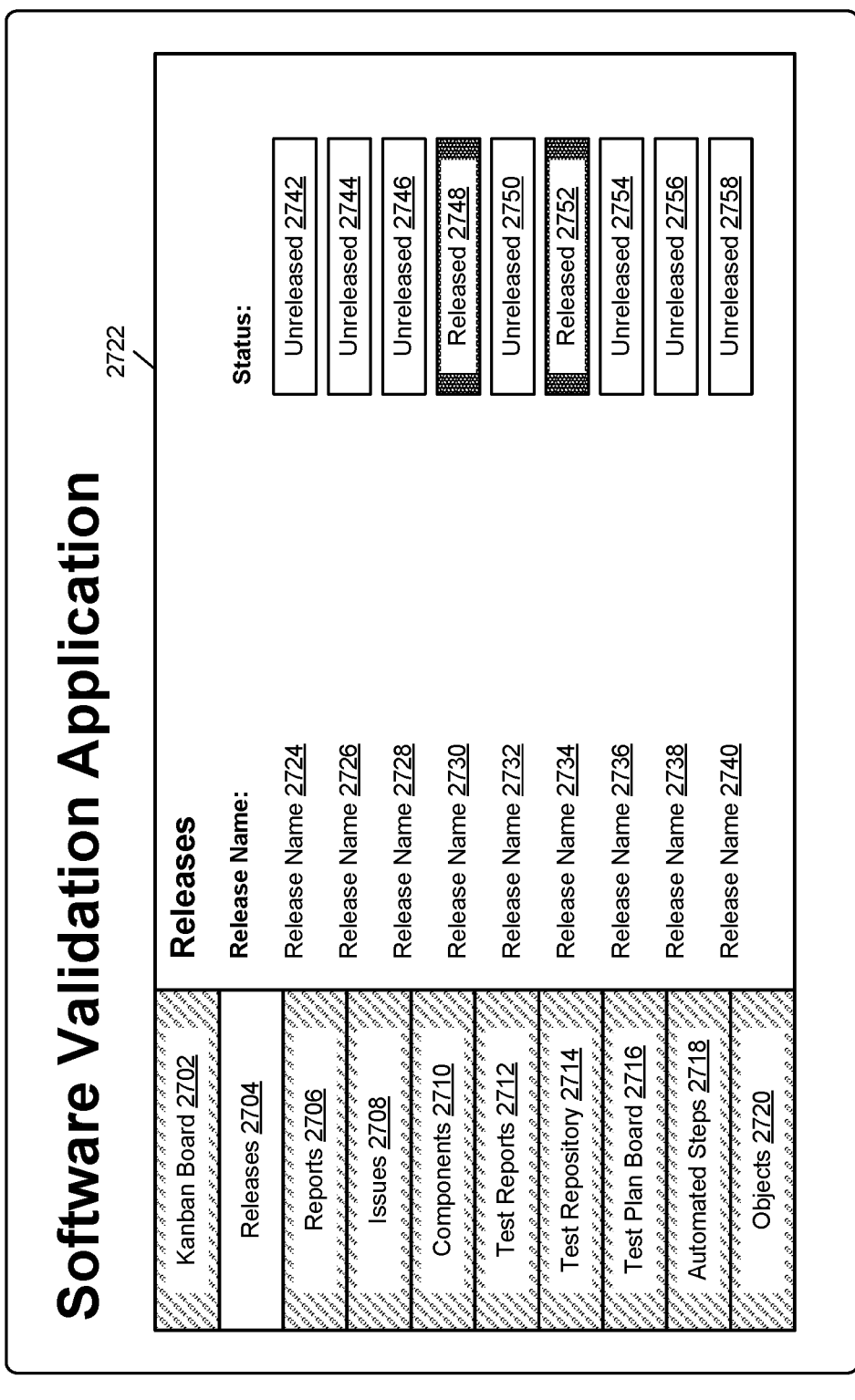

As shown in FIG. 27, the graphical user interface 2600 includes one or more selectable tabs and display a section in response to the user selecting each section. In various implementations, the graphical user interface 2600 includes a "Kanban Board" tab 2702, a "Releases" tab 2704, a "Reports" tab 2706, an "Issues" tab 2708, a "Components" tab 2710, a "Test Reports" tab 2712, a "Test Repository" tab 2714, a "Test Plan Board" 2716, an "Automated Steps" tab 2718, and/or an "Objects" tab 2720. The software validation application 308 may generate a release container section 2722 in response to the user selecting the "Releases" tab 2704. The software validation application 308 may automatically populate the release container section 2722 with one or more selectable fields, such as selectable fields 2724-2740. Each of the selectable fields 2724-2740 may correspond to a release container generated by user interactions with the release container creation screen 2602. Although nine selectable fields 2724-2740 are shown in FIG. 27, the release container section 2722 may include any number of selectable fields 2724-2740, for example, corresponding to the number of release containers generated by the software validation application 308.

The release container section 2722 may include one or more status indicators 2742-2758. In various implementations, each status indicator may correspond to one of the selectable fields 2724-2740 (for example, one of the release containers) and indicate a status of the software release associated with the release container (for example, "Unreleased" or "Released"). The user may select any of the selectable fields 2724-2740. In response to the user selecting one of the selectable fields 2724-2740, the software validation application 308 generates a release section 2800 at the graphical user interface 2600 for the software release associated with the selected one of the selectable fields 2724-2740. In various implementations, the release section 2800 may include one or more selectable fields 2802-2818 and/or one or more status indicators 2820-2836 corresponding with one of the selectable fields 2802-2818.

Figure 28:
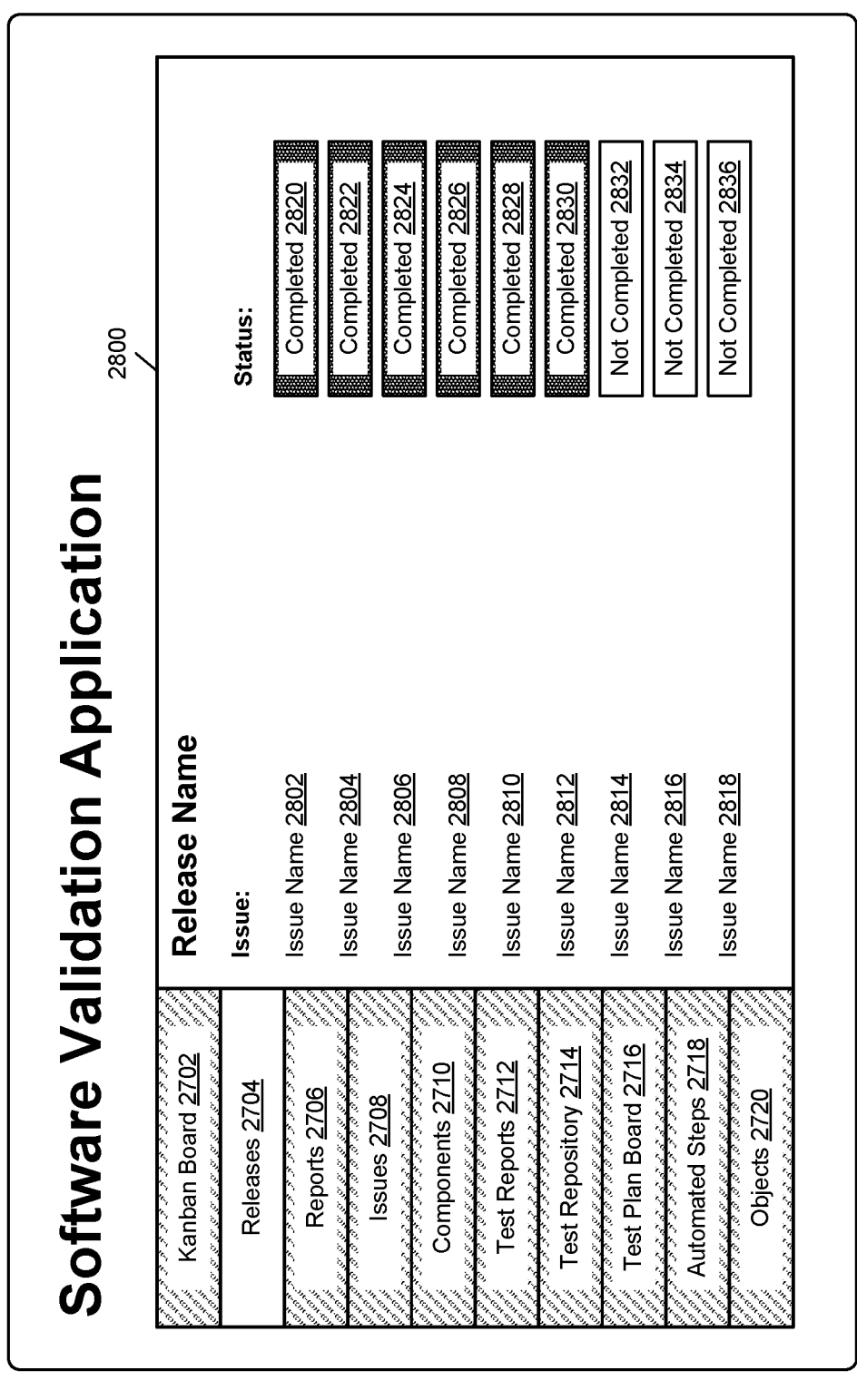

Each selectable field 2802-2818 may correspond to an issue associated with the release container. Each issue may represent a task, feature, report, or any piece of work related to the software release that needs to be tracked. In various implementations, each of the status indicators 2820-2836 may display a status for the corresponding selectable field 2802-2818 (for example, whether the issue associated with the selectable field is "Completed" or "Not Completed"). Although nine selectable fields 2802-2818 and nine status indicators 2820-2836 are shown in FIG. 28, the release section 2800 may include any number of selectable fields 2802-2818 and status indicators 2820-2836 corresponding to any number of issues created by the user and tagged to the release container. Returning to FIG. 24, in the message sequence chart 2400, the developer device 102 accesses the software release validation platform 108 and creates issues related to the software release (at operation 2404). In the message sequence chart 2400, the developer device 102 accesses the software release validation platform 108 and tags issues to the release container (at operation 2406).

Figure 29:
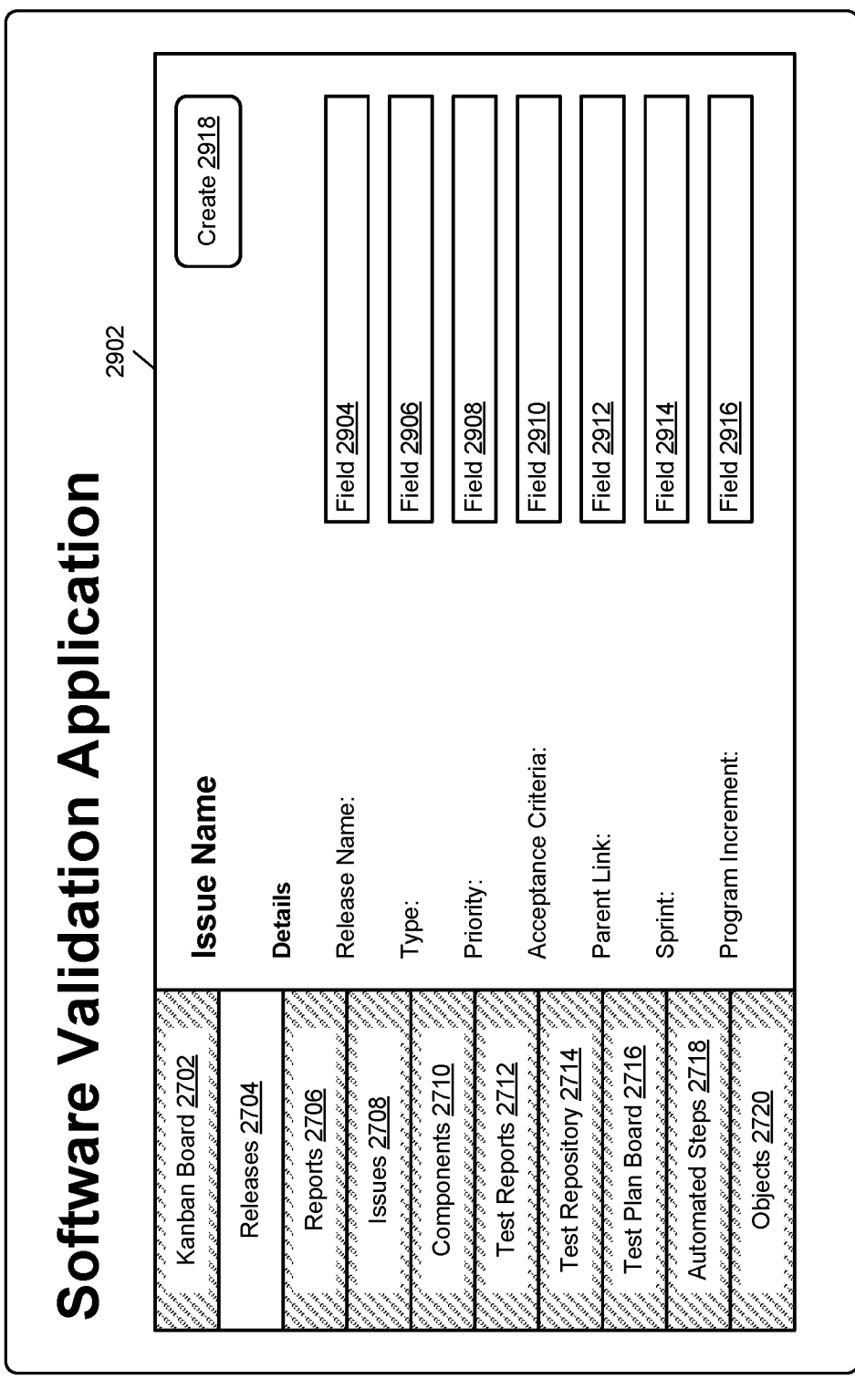
Figure 31:
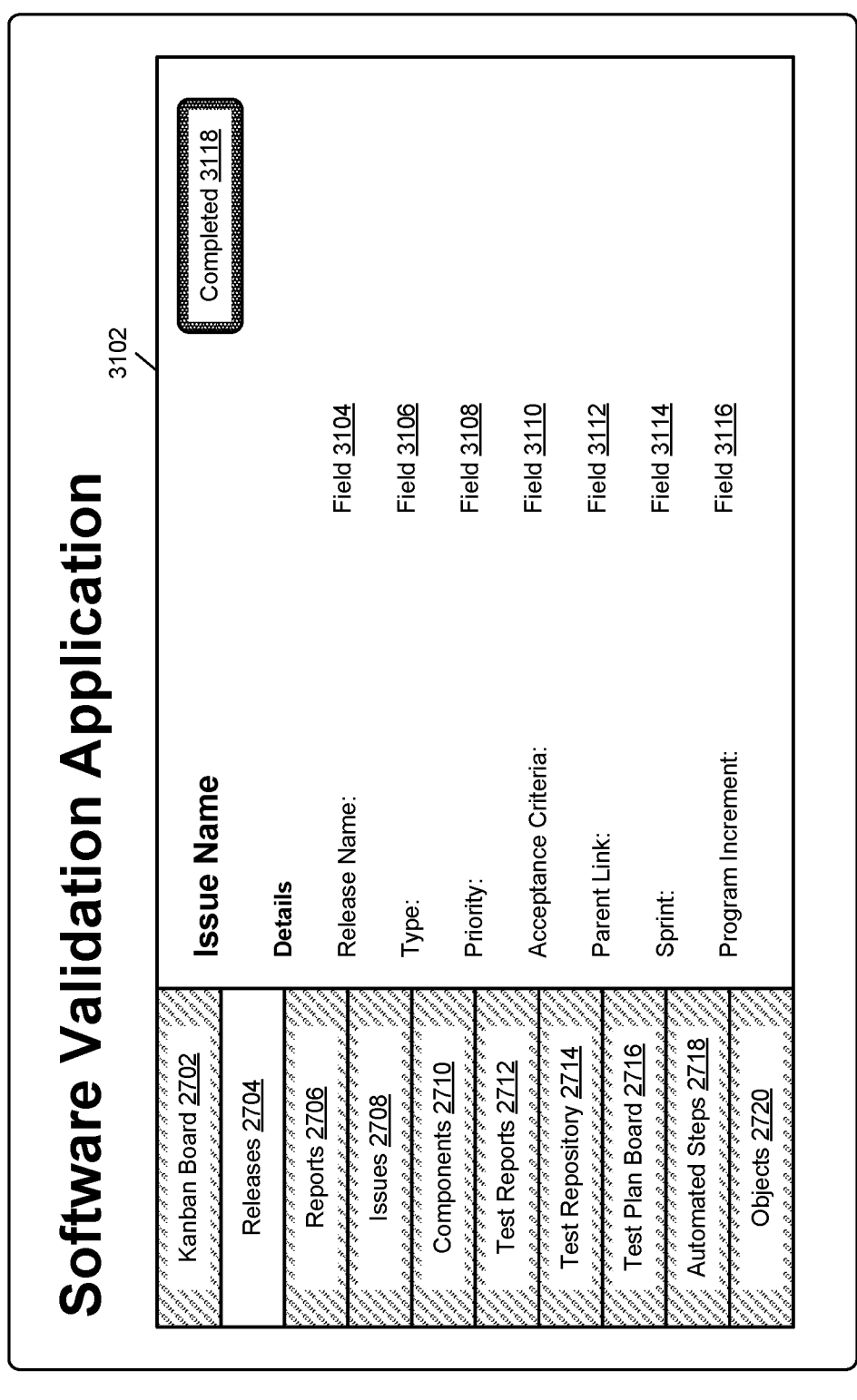

For example, as shown in FIG. 29, the software validation application 308 generates an issue creation section 2902 at the graphical user interface 2600. The issue creation section includes one or more fillable fields, such as fields 2904-2916. In various implementations, each of the fields 2904-2916 may include a text box, a text area, a dropdown menu with one or more selectable options, or a date picker allowing users to select a date from a calendar or enter a date in a predefined format. In some examples, field 2904 allows the user to enter a release name. In various implementations, field 2906 allows the user to specify a type of issue. In some examples, field 2908 allows the user to specify a priority for the issue. In various implementations, field 2910 allows the user to specify acceptance criteria for the issue. In some examples, field 2912 allows the user to enter a link to a parent issue or the software release that the issue is associated with. In various implementations field 2914 allows the user to specify a sprint during which the issue is to be completed. In some examples, field 2916 allows the user to specify a program increment during which the issue is to be completed. After the user populates one or more of the fields 2904-2916, the user may select a selectable "Create" button 2918 and the software validation application 308 generates the issue and tags the issue to the appropriate release container (for example, based on the release name entered in field 2904). Each issue corresponding to one of the selectable fields 2802-2818 of the release section 2800 may be generated according to techniques described with reference to FIG. 29.

Returning to FIG. 24, in the message sequence chart 2400, the developer device 102 uploads source code associated with the software release to the source code repository platform 104 (at operation 2408). For example, the developer device accesses the source code repository application 208 via the communications system 116, uploads the source code to the source code repository 210 via the source code repository application 208. In the message sequence chart 2400, the developer device 102 accesses the source code repository platform 104 and tags the uploaded source code to issues (at operation 2410). FIG. 30 is a diagram illustrating an example a graphical user interface 3000 generated by the source code repository platform 104. For example, the source code repository application 208 generates the graphical user interface 3000, and the user accesses the graphical user interface 3000 via the developer device 102 and the communications system 116. The graphical user interface may include one or more fields 3002-3018, with each of the fields 3002-3018 corresponding to a commit. Each commit represents a set of changes to source code and/or files within the source code repository 210. Each of the fields 3002-3018 may have a corresponding one of the selectable fields 3020-3036. Each one of the selectable fields 3020-3036 may allow the user to input or select an issue. The source code repository application 208 tags the source code associated with the commit to the issue input or selected by the issue.

Returning to FIG. 24, in the message sequence chart 2400, the developer device 102 accesses the software release validation platform 108 and updates the status of issues within the release container (at operation 2412). For example, the user selects an issue in the release container by selecting one of the selectable fields 2802-2818 at the release section 2800. In response to the user selecting one of the selectable fields 2802-2818, the software validation application 308 generates an issue modification section 3102 at the graphical user interface 2600. The issue modification section 3102 may include one or more fields 3104-3116, each displaying values previously entered into or selected at a respective one of the fields 2904-2916 for the issue at the issue creation section 2902. The issue modification section 3102 may also include a selectable "Completed" button 3118. In response to the user selecting the selectable "Completed" button 3118, the software validation application 308 marks the issue as completed and updates the corresponding status indicator 2820-2836 to "Completed" at the release section 2800.

Returning to FIG. 24, in the message sequence chart 2400, the developer device 102 accesses the software release validation platform 108 and updates the status of the release container (at operation 2414). For example, the software validation application 308 generates a release container modification screen 3202 (shown in FIG. 32). In various implementations, the release container modification screen 3202 includes a plurality of fields 3204-3242, each displaying values previously entered into or selected at a respective one of the fields 2604-2642 of the release container creation screen 2602 when creating the release container. The user may select a selectable "Completed" button 3244 at the release container modification screen 3202. In response to the user selecting the selectable "Completed" button 3244, the software validation application 308 updates the status of the release container to completed.

Turning to FIG. 25, in the message sequence chart 2400, in response to the status of the release container being set to completed, the software release validation platform 108 transmits a command signal to the software release deployment platform 112 commanding the software release deployment platform 112 to deploy the software release (at operation 2416). For example, in response to the status of the release container being set to completed, the software validation application 308 generates the command signal to deploy the software release associated with the release container to the production platform 114. The software validation application 308 transmits the command signal to the software deployment application 408 via the communications system 116. In the message sequence chart 2400, in response to receiving the command signal, the software release deployment platform 112 accesses the release container (associated with the software release) at the software release validation platform 108 and processes the status of each issue in the release container (at operation 2418). For example, the software deployment application 408 accesses the release container via the communications system 116 and determines whether each issue in the release container is set to completed.

In the message sequence chart 2400, in response to the software release deployment platform 112 determining that each issue in the release container is set to completed, the software release deployment platform 112 retrieves the source code of the software release from the source code repository platform 104 (at operation 2420). For example, the software deployment application 408 requests the source code from the source code repository application 208, and the source code repository application 208 retrieves the source code from the source code repository 210 and transmits the source code to the software release deployment platform 112 via the communications system 116.

In the message sequence chart 2400, in response to the software release deployment platform 112 determining that each issue in the release container is set to completed, the software release deployment platform 112 compiles the source code (at operation 2420). For example, the software deployment application 408 compiles the retrieved source code. In the message sequence chart 2400, in response to the software release deployment platform 112 determining that each issue in the release container is set to completed, the software release deployment platform 112 deploys the compiled software release to the production platform 114. For example, the software deployment application 408 transmits the compiled software release to the production platform 114 via the communications system 116.

In the message sequence chart 2400, in response to the software release deployment platform 112 determining that each issue in the release container is not set to completed, the software release deployment platform 112 transmits an error message to the developer device 102. For example, the software deployment application 408 generates an error message indicating that the governance controls have not been fully implemented for the software release and transmits the error message to the developer device via the communications system 116.

FIG. 33 is a flowchart illustrating an example process 3300 for automatically generating metrics related to the software development process of FIGS. 24 and 25. In the example process 3300, the software release validation platform 108 accesses all commits at the source code repository platform 104 tagged to a release container (at block 3302). For example, the software validation application 308 accesses the source code repository 210 and selects all commits tagged to issues within the release container. In the example process 3300, the software release validation platform 108 determines a date-time group associated with each commit (at block 3304). For example, the software validation application 308 determines a timestamp in the source code repository 210 associated with each commit and determines the date-time group associated with the timestamp. In the example process 3300, the software release validation platform 108 determines the first commit associated with the release container (at block 3306). For example, the software validation application 308 selects the commit having the earliest date-time group and determines the commit having the earliest date-time group as the first commit.

In the example process 3300, the software release validation platform 108 determines a date-time group corresponding to when the release container was set to completed (at block 3308). For example, the software validation application 308 logs when the user sets the release container to completed and determines the date-time group from the log. In the example process 3300, the software release validation platform 108 determines a difference between the date-time group when the release container was set to completed and the date-time group of the first commit (at block 3310). For example, the software validation application 308 determines a difference between the date-time group computed at block 3308 and the date-time group computed at block 3306.

In the example process 3300, the software release validation platform 108 determines an effective lead time metric based on the difference (at block 3312). For example, the software validation application 308 sets the difference computed at block 3308 as the effective lead time metric. In the example process 3300, the software release validation platform 108 transmits the effective lead time metric to the stakeholder device 110. For example, the software validation application 308 generates a message including the effective lead time metric and transmits the message to the stakeholder device 110 via the communications system 116.

FIG. 34 is an example illustrating a graphical user interface 3400 displaying an example message 3402 generated by the software release validation platform 108 containing the effective lead time metric. As shown in FIG. 34, the message 3402 includes one or more fields identifying one or more software releases (e.g., release name fields 3404-3416). Although seven release name fields are shown in the example message 3402, the message 3402 may include any number of release name fields. In various implementations, the message 3402 may include an estimated start date for each release name field, such as start date fields 3418-3432. Each start date field may show a date or a date-time group associated with the first commit for the respective software release (for example, computed at block 3306 of process 3300).

In some examples, the message 3402 may include an estimated end date for each release name field, such as end date fields 3434-3446. Each end date field may show a date or a date-time group associated with when the release container was set to completed (for example, computed at block 3308 of process 3300). In various implementations, the message 3402 may include an effective lead time for each respective release name field, such as lead time fields 3448-3460. Each lead time field may show the effective lead time computed for the respective software release at block 3312 of process 3300.

The foregoing description is merely illustrative in nature and does not limit the scope of the disclosure or its applications. The broad teachings of the disclosure may be implemented in many different ways. While the disclosure includes some particular examples, other modifications will become apparent upon a study of the drawings, the text of this specification, and the following claims. In the written description and the claims, one or more processes within any given method may be executed in a different order—or processes may be executed concurrently or in combination with each other—without altering the principles of this disclosure. Similarly, instructions stored in a non-transitory computer-readable medium may be executed in a different order—or concurrently—without altering the principles of this disclosure. Unless otherwise indicated, the numbering or other labeling of instructions or method steps is done for convenient reference and does not necessarily indicate a fixed sequencing or ordering.

Unless the context of their usage unambiguously indicates otherwise, the articles "a," "an," and "the" should not be interpreted to mean "only one." Rather, these articles should be interpreted to mean "at least one" or "one or more." Likewise, when the terms "the" or "said" are used to refer to a noun previously introduced by the indefinite article "a" or "an," the terms "the" or "said" should similarly be interpreted to mean "at least one" or "one or more" unless the context of their usage unambiguously indicates otherwise.

Spatial and functional relationships between elements—such as modules—are described using terms such as (but not limited to) "connected," "engaged," "interfaced," and/or "coupled." Unless explicitly described as being "direct," relationships between elements may be direct or include intervening elements. The phrase "at least one of A, B, and C" should be construed to indicate a logical relationship (A OR B OR C), where OR is a non-exclusive logical OR, and should not be construed to mean "at least one of A, at least one of B, and at least one of C." The term "set" does not necessarily exclude the empty set. For example, the term "set" may have zero elements. The term "subset" does not necessarily require a proper subset. For example, a "subset" of set A may be coextensive with set A, or include elements of set A. Furthermore, the term "subset" does not necessarily exclude the empty set.

In the figures, the directions of arrows generally demonstrate the flow of information—such as data or instructions. The direction of an arrow does not imply that information is not being transmitted in the reverse direction. For example, when information is sent from a first element to a second element, the arrow may point from the first element to the second element. However, the second element may send requests for data to the first element, and/or acknowledgements of receipt of information to the first element. Furthermore, while the figures illustrate a number of components and/or steps, any one or more of the components and/or steps may be omitted or duplicated, as suitable for the application and setting.

The term computer-readable medium does not encompass transitory electrical or electromagnetic signals or electromagnetic signals propagating through a medium-such as on an electromagnetic carrier wave. The term "computer-readable medium" is considered tangible and non-transitory. The functional blocks, flowchart elements, and message sequence charts described above serve as software specifications that can be translated into computer programs by the routine work of a skilled technician or programmer.

It should also be understood that although certain drawings illustrate hardware and software as being located within particular devices, these depictions are for illustrative purposes only. In some embodiments, the illustrated components may be combined or divided into separate software, firmware, and/or hardware. For example, instead of being located within and performed by a single electronic processor, logic and processing may be distributed among multiple electronic processors. Regardless of how they are combined or divided, hardware and software components may be located on the same computing device, or they may be distributed among different computing devices—such as computing devices interconnected by one or more networks or other communications systems.

In the claims, if an apparatus or system is claimed as including an electronic processor or other element configured in a certain manner, the claim or claimed element should be interpreted as meaning one or more electronic processors (or other element as appropriate). If the electronic processor (or other element) is described as being configured to make one or more determinations or one or execute one or more steps, the claim should be interpreted to mean that any combination of the one or more electronic processors (or any combination of the one or more other elements) may be configured to execute any combination of the one or more determinations (or one or more steps).

What is claimed is:

1. A system comprising:
a software release validation platform including a first electronic processor configured to:
    receive a first input at a first input field of a graphical user interface,
    generate a release container associated with the first input,
    receive a second input at a second input field of the graphical user interface,
    generate an issue and automatically associate the issue with the release container based on the second input,
    receive a third input at a third input field of the graphical user interface, and
    transmit a command signal in response to receiving the third input; and
a software release deployment platform including a second electronic processor configured to:
    receive the command signal,
    in response to receiving the command signal, access the software release validation platform and process a status of each issue of a plurality of issues associated with the release container, and
    in response to the status of each issue of the plurality of issues having a completed status:
        retrieve source code from a source code repository platform,
        compile the source code,
        deploy the compiled source code to a production platform, and
        determine an effective lead time metric based on a difference between (i) a first date-time group associated with a first commit among a plurality of commits tagged to the plurality of issues associated with the release container and (ii) a second date-time group corresponding to a time at which the software release deployment platform determines that each issue of the plurality of issues has the completed status.

2. The system of claim 1, wherein the first input includes an identifier of a software release.

3. The system of claim 2, wherein the second input includes the identifier of the software release.

4. The system of claim 3, wherein the source code is tagged with the identifier of the software release.

5. The system of claim 4, wherein:
the source code repository platform includes the plurality of commits tagged to the issue; and
each commit includes source code.

6. The system of claim 5, wherein the retrieved source code is associated with a commit tagged to the issue.

7. The system of claim 1, wherein the first electronic processor is configured to:
generate a message containing the effective lead time metric; and
transmit the message to a stakeholder device.

8. A method comprising:
receiving, with a software release validation platform, a first input at a first input field of a graphical user interface;
generating, with the software release validation platform, a release container associated with the first input;
receiving, with the software release validation platform, a second input at a second input field of the graphical user interface;
generating, with the software release validation platform, an issue and automatically associating the issue with the release container based on the second input;
receiving, with the software release validation platform, a third input field at a third input field of the graphical user interface;
transmitting, with the software release validation platform, a command signal in response to receiving the third input;
receiving, with a software release deployment platform, the command signal;
accessing, with the software release deployment platform, the software release validation platform and processing a status of each issue of a plurality of issues associated with the release container in response to receiving the command signal; and
in response to the status of each issue of the plurality of issues having a completed status:
retrieving, with the software release deployment platform, source code from a source code repository platform,
compiling, with the software release deployment platform, the source code,
deploying, with the software release deployment platform, the source code to a production platform, and
determining an effective lead time metric based on a difference between (i) a first date-time group associated with a first commit among a plurality of commits tagged to the plurality of issues associated with the release container and (ii) a second date-time group corresponding to a time at which the software release deployment platform determines that each issue of the plurality of issues has the completed status.

9. The method of claim 8, wherein the first input includes an identifier of a software release.

10. The method of claim 9, wherein the second input includes the identifier of the software release.

11. The method of claim 10, wherein the source code is tagged with the identifier of the software release.

12. The method of claim 11, wherein:

the source code repository platform includes the plurality of commits tagged to the issue; and each commit includes source code.

13. The method of claim 12, wherein the retrieved source code is associated with a commit tagged to the issue.

14. The method of claim 8, further comprising:

generating, with the software release validation platform, a message containing the effective lead time metric; and transmitting, with the software release validation platform, the message to a stakeholder device.

\* \* \* \* \*